US012182306B2

(12) United States Patent
Lynner

(10) Patent No.: US 12,182,306 B2
(45) Date of Patent: Dec. 31, 2024

(54) SYSTEMS AND METHODS FOR DATA PROTECTION DURING DYNAMIC ORDER MANAGEMENT

(71) Applicant: Stephen K. Lynner, Westerly, RI (US)

(72) Inventor: Stephen K. Lynner, Westerly, RI (US)

( * ) Notice: Subject to any disclaimer, the term of this patent is extended or adjusted under 35 U.S.C. 154(b) by 0 days.

(21) Appl. No.: 18/640,568

(22) Filed: Apr. 19, 2024

(65) Prior Publication Data

US 2024/0265137 A1 Aug. 8, 2024

(51) Int. Cl.

*G06Q 40/00* (2023.01)
*G06F 21/62* (2013.01)
*G06Q 10/087* (2023.01)
*G06Q 40/04* (2012.01)
*G06Q 40/06* (2012.01)

(52) U.S. Cl.

CPC ....... *G06F 21/6245* (2013.01); *G06Q 10/087* (2013.01); *G06Q 40/04* (2013.01); *G06Q 40/06* (2013.01)

(58) Field of Classification Search

CPC .. G06F 21/6245; G06Q 10/087; G06Q 40/04; G06Q 40/06
USPC ................... 705/35, 37, 38, 39, 40, 45, 335; 707/693, 750; 709/224, 203, 200; 704/502; 706/45; 370/390, 242, 395.2
See application file for complete search history.

(56) References Cited

U.S. PATENT DOCUMENTS 7,818,246 B2 * 10/2010 Cushing ................. G06Q 40/04 705/37
8,073,763 B1 * 12/2011 Merrin ................... G06Q 40/04 705/37
8,099,337 B2 * 1/2012 Guldner ............... G06Q 10/087 705/28
8,332,303 B2 * 12/2012 Buckwalter ............ G06Q 40/04 705/37
8,352,353 B1 * 1/2013 Brookfield ............. G06Q 40/06 705/37
8,583,540 B2 * 11/2013 Claus ..................... G06Q 40/00 705/37
8,612,323 B1 * 12/2013 Frait .................. G06Q 30/0207 705/37

(Continued)

OTHER PUBLICATIONS

A Privacy-Preserving Model for Big Data; 2022 10th International Japan-Africa Conference on Electronics, Communications, and Computations (JAC-ECC) (2022, pp. 246-251); Amr Morad, Mohamed S. Abougabal, Ayman Khalafallah; Dec. 19, 2022. (Year: 2022).*

*Primary Examiner* — Tien C Nguyen
(74) *Attorney, Agent, or Firm* — Foley & Lardner LLP

(57) ABSTRACT

A method for safeguarding data in dynamic relational order management involves receiving a data feed and a dynamic order with various order attributes, including a protected dataset and an unprotected dataset. The protected dataset, containing a request type and a reserve execution threshold, is obfuscated from display on a respondent system. Instructions are transmitted to the respondent system to present a proposal request dataset for executing the dynamic order, comprising the unprotected dataset and the data feed. A proposal response dataset is received from the respondent system, including first and second execution values. Adjusted values are generated based on the received data, and an execution action is performed when the adjusted execution values meet the adjusted reserve execution threshold.

19 Claims, 24 Drawing Sheets

(56) References Cited

U.S. PATENT DOCUMENTS

| | | | | | |
|---|---|---|---|---|---|
| 2005/0114257 | A1* | 5/2005 | Penney | G06Q 40/04 705/37 |
| 2008/0235128 | A1* | 9/2008 | Twine | G06Q 40/04 705/37 |
| 2011/0093317 | A1* | 4/2011 | Chan | G06Q 30/08 705/26.3 |
| 2012/0130882 | A1* | 5/2012 | Smith | G06Q 40/04 705/37 |
| 2012/0330816 | A1* | 12/2012 | Farrell | G06Q 40/04 705/37 |
| 2013/0030982 | A1* | 1/2013 | Sofianos | G06Q 40/06 705/37 |
| 2019/0303031 | A1* | 10/2019 | Sabourin | G06F 3/0673 |
| 2023/0128539 | A1* | 4/2023 | Xu | G06Q 10/0838 705/335 |

* cited by examiner

400

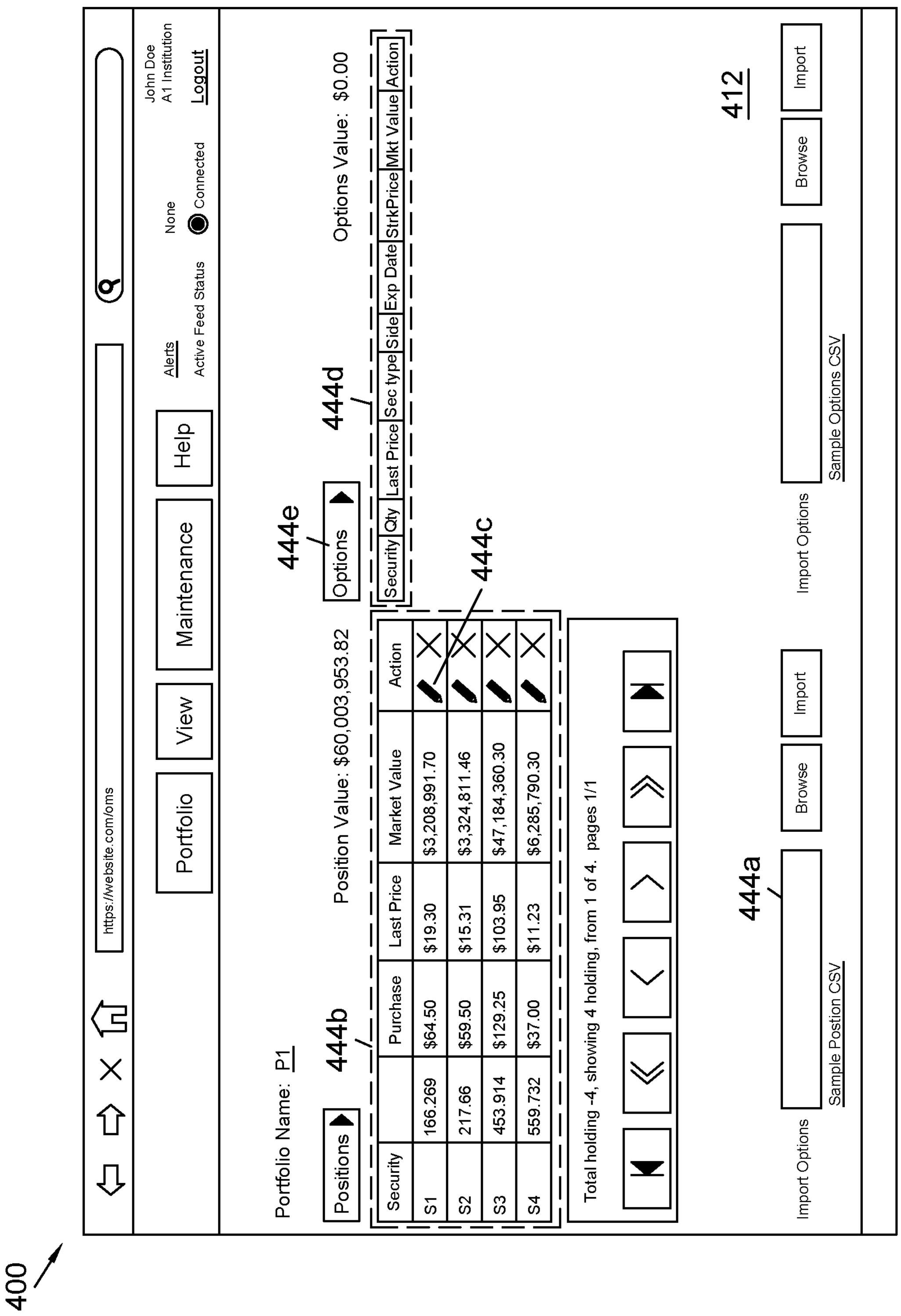

FIG. 4F

| Portfolio Name: P1 | | | | |
|---|---|---|---|---|
| Positions ▲ 444b | | Position Value: $60,003,953.82 | | |
| Security | Purchase | Last Price | Market Value | Action |
| S1 | 166.269 $64.50 | $19.30 | $3,208,991.70 | ✏ ✕ |
| S2 | 217.66 $59.50 | $15.31 | $3,324,811.46 | ✏ ✕ |
| S3 | 453.914 $129.25 | $103.95 | $47,184,360.30 | ✏ ✕ |
| S4 | 559.732 $37.00 | $11.23 | $6,285,790.30 | ✏ ✕ |

Total holding -4, showing 4 holding, from 1 of 4. pages 1/1

Options ▲ 444e — Options Value: $0.00

| Security | Qty | Last Price | Sec type | Side | Exp Date | StrkPrice | Mkt Value | Action |
|---|---|---|---|---|---|---|---|---|

444d

Import Options — Browse — Import
Sample Position CSV — 444a

Import Options — Browse — Import — 412
Sample Options CSV

400

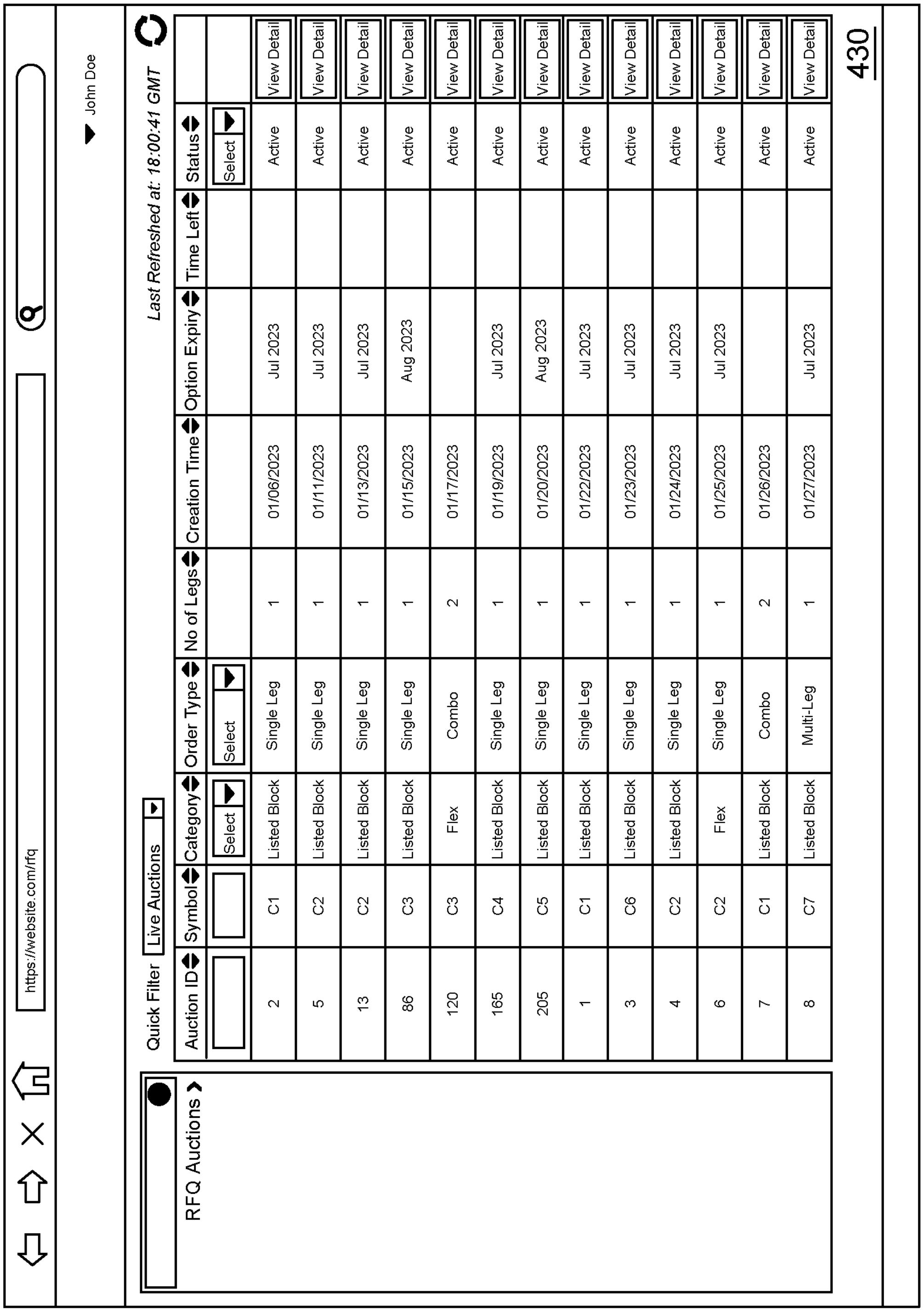

| Auction ID | Symbol | Category | Order Type | No of Legs | Creation Time | Option Expiry | Time Left | Status | |
|---|---|---|---|---|---|---|---|---|---|
| | | Select | Select | | | | | Select | |
| 2 | C1 | Listed Block | Single Leg | 1 | 01/06/2023 | Jul 2023 | | Active | View Detail |
| 5 | C2 | Listed Block | Single Leg | 1 | 01/11/2023 | Jul 2023 | | Active | View Detail |
| 13 | C2 | Listed Block | Single Leg | 1 | 01/13/2023 | Jul 2023 | | Active | View Detail |
| 86 | C3 | Listed Block | Single Leg | 1 | 01/15/2023 | Aug 2023 | | Active | View Detail |
| 120 | C3 | Flex | Combo | 2 | 01/17/2023 | | | Active | View Detail |
| 165 | C4 | Listed Block | Single Leg | 1 | 01/19/2023 | Jul 2023 | | Active | View Detail |
| 205 | C5 | Listed Block | Single Leg | 1 | 01/20/2023 | Aug 2023 | | Active | View Detail |
| 1 | C1 | Listed Block | Single Leg | 1 | 01/22/2023 | Jul 2023 | | Active | View Detail |
| 3 | C6 | Listed Block | Single Leg | 1 | 01/23/2023 | Jul 2023 | | Active | View Detail |
| 4 | C2 | Listed Block | Single Leg | 1 | 01/24/2023 | Jul 2023 | | Active | View Detail |
| 6 | C2 | Flex | Single Leg | 1 | 01/25/2023 | Jul 2023 | | Active | View Detail |
| 7 | C1 | Listed Block | Combo | 2 | 01/26/2023 | | | Active | View Detail |
| 8 | C7 | Listed Block | Multi-Leg | 1 | 01/27/2023 | Jul 2023 | | Active | View Detail |

FIG. 4O

Options

RFQ Auctions

Create your Response

Leg 1

| | |
|---|---|
| Symbol | S1 111217C00047000(3.25/3.35) |
| Security Type | Equity Option |
| Category | Listed Block |
| Symbol | S1 (47.31) |
| No Of Contract | 500 |
| Expiry Date | 07/18/2024 |
| Exercise Price | 13.0 |
| Put/Call | Call |
| AON | No |
| Option Model | American |
| Order Type | Equity Option / Contract Only-Contract Constant |
| *Quantity | |
| *Bid Wanted | |
| Volatility | |
| *Offer Wanted | |
| Volatility | |

* Indicates required field. Click on P or V button to calculate Price or Volatility, as applicable.

Back    Send 458a
458b
432

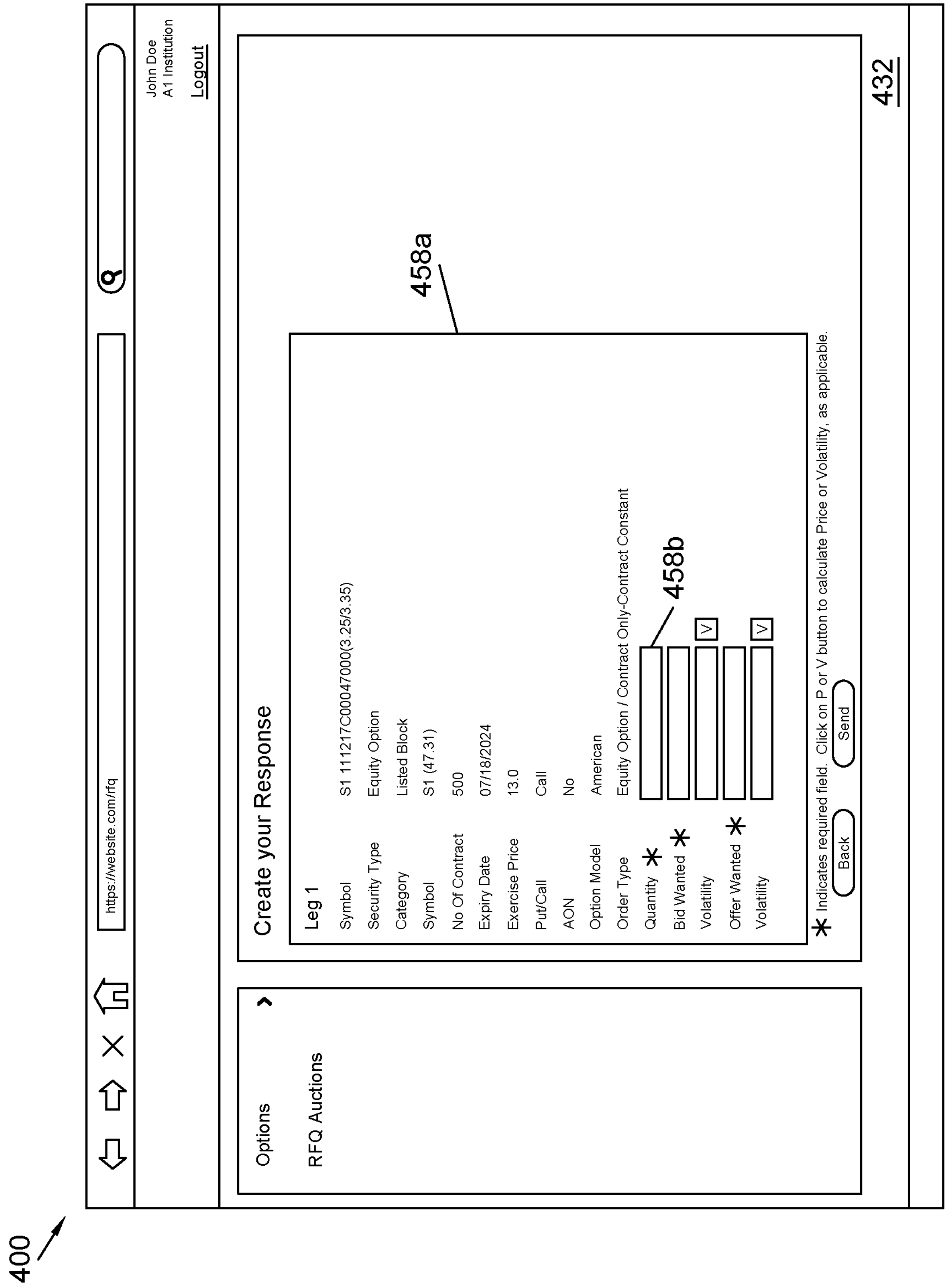

FIG. 4P

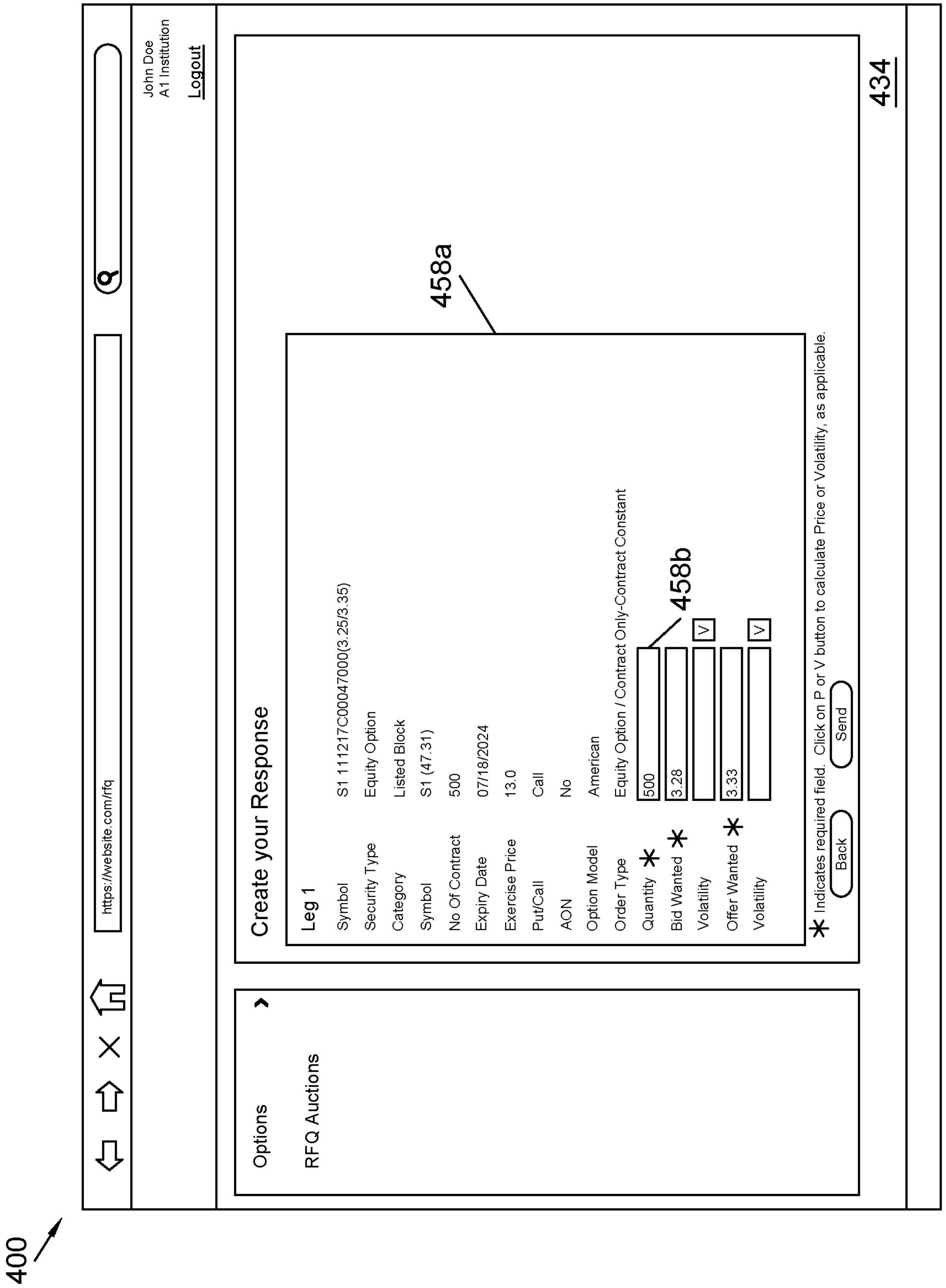

FIG. 4Q

Create your Response

Leg 1

| | |
|---|---|
| Symbol | S1 111217C00047000(3.25/3.35) |
| Security Type | Equity Option |
| Category | Listed Block |
| Symbol | S1 (47.31) |
| No Of Contract | 500 |
| Expiry Date | 07/18/2024 |
| Exercise Price | 13.0 |
| Put/Call | Call |
| AON | No |
| Option Model | American |
| Order Type | Equity Option / Contract Only-Contract Constant |
| *Quantity | 500 |
| Bid Wanted | 3.28 |
| Volatility | [v] |
| Offer Wanted | 3.33 |
| Volatility | [v] |

* Indicates required field. Click on P or V button to calculate Price or Volatility, as applicable.

(Back)  (Send)

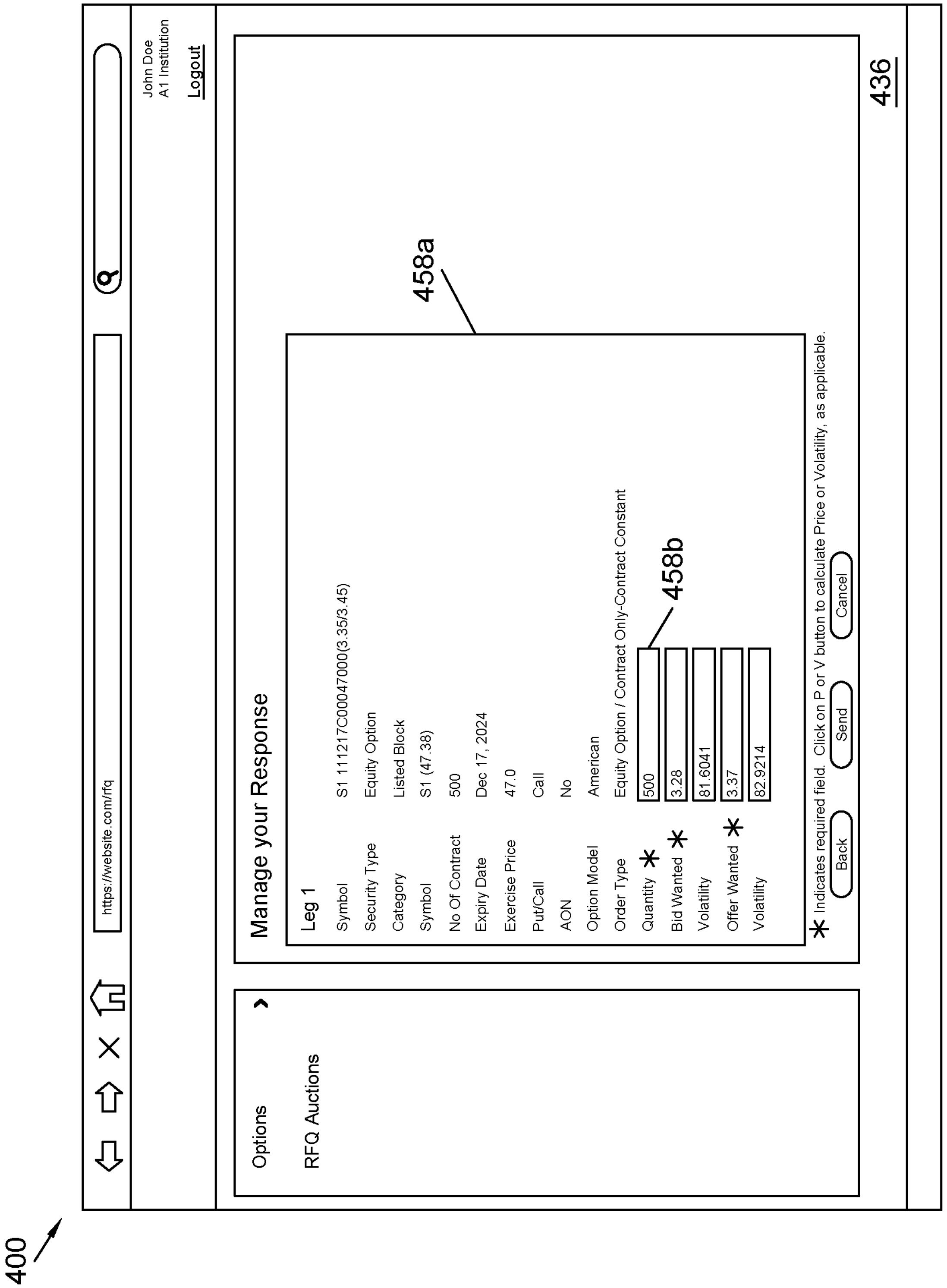

FIG. 4R

Manage your Response

Leg 1
Symbol: S1 111217C00047000(3.35/3.45)
Security Type: Equity Option
Category: Listed Block
Symbol: S1 (47.38)
No Of Contract: 500
Expiry Date: Dec 17, 2024
Exercise Price: 47.0
Put/Call: Call
AON: No
Option Model: American
Order Type: Equity Option / Contract Only-Contract Constant
Quantity *: 500
Bid Wanted *: 3.28
Volatility: 81.6041
Offer Wanted *: 3.37
Volatility: 82.9214

* Indicates required field. Click on P or V button to calculate Price or Volatility, as applicable.

[Back] [Send] [Cancel]

Portfolio Name: P1

| Security | Purchase | Last Price | Market Value | Action |
|---|---|---|---|---|
| S1 | 166.269 | $64.50 | $19.30 | $3,208,991.70 | ✏ ✗ |
| S2 | 217.66 | $59.50 | $15.31 | $3,324,811.46 | ✏ ✗ |
| S3 | 453.914 | $129.25 | $103.95 | $47,184,360.30 | ✏ ✗ |
| S4 | 559.732 | $37.00 | $11.23 | $6,285,790.30 | ✏ ✗ |

Position Value: $60,003,953.82

Total holding ~4, showing 4 holding, from 1 of 4. pages 1/1

Options Value: $319.50

| Security | Qty | Last Price | Sec type | Side | Exp Date | StrkPrice | Mkt Value | Action |
|---|---|---|---|---|---|---|---|---|
| S5 | 500 | $0.64 | C/Listed | Buy | 7/18/2024 | $13.00 | $319.50 | ✏ ✗ |

Total holding ~4, showing 4 holding, from 1 of 4. pages 1/1

Import Options — Sample Position CSV — Browse — Import

Import Options — Sample Options CSV — Browse — Import

438

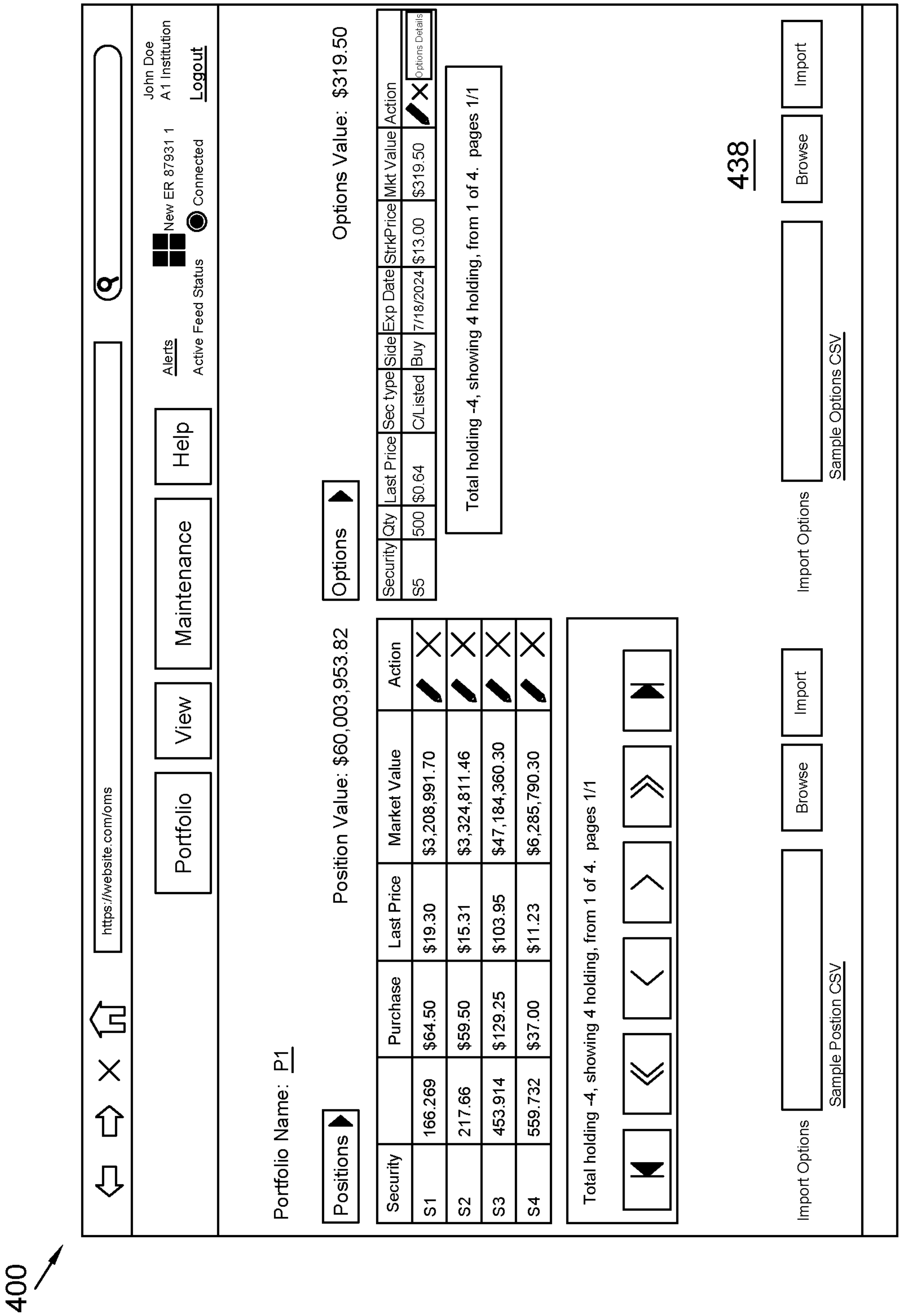

FIG. 4S

SYSTEMS AND METHODS FOR DATA PROTECTION DURING DYNAMIC ORDER MANAGEMENT

CROSS-REFERENCE TO RELATED PATENT

This application is related to and incorporates by reference, in its entirety, U.S. Pat. No. 8,311,921, granted on Nov. 13, 2012.

TECHNICAL FIELD

This invention relates generally to systems and methods for data protection during dynamic order management and in particular, systems and methods that facilitate the anonymous creation, communication, and/or management of a dynamic order.

BACKGROUND

Current, dynamic underlyer order management systems rely heavily on phone calls and instant messaging between liquidity requesters and liquidity providers. This traditional process introduces several pain points and problems. Confidential information about large underlyer orders, such as the underlyer, the type of order, and/or the originating party often leaks from the various parties involved, at times unintentionally, and at others, nefariously. This leaked information allows parties to preemptively take action ahead of the completion of the order, thereby unfairly taking advantage of the conventional system. Likewise, the preemptive actions unnaturally drive movement of the value of the underlyer associated with the dynamic order. This traditional process of phone calls and instant messaging can take several minutes to complete an order. During this period, the underlyer may shift, leading to the need to redetermine each party's basis, leading to delays, inefficiencies, miscommunication, and unfulfilled orders.

SUMMARY

Disclosed herein are systems and methods capable of addressing the above-described shortcomings and may also provide any number of additional or alternative benefits and advantages. For example, the embodiments described herein solve the various pain points and technical shortcomings of traditional, dynamic relational order management, by providing increased anonymity, protection, and data security of actionable information during dynamic relational order management. In addition, the embodiments described herein provide systems and methods of modeling products for improving corresponding product identification and selection for acquisition.

By way of example, the methods and systems discussed herein provide for a multi-system paradigm that improves data security and allows an originator system to generate a dynamic order (e.g., an exchange of a security interest) and initiate a request for a two-sided proposal (e.g., including both a bid and an offer) to execute the dynamic order. The dynamic order is transmitted by the originator system to an execution system that bifurcates the data associated with the dynamic order into protected data and unprotected data. The execution system then transmits the dynamic order to one or more respondent systems to respond to the dynamic order with the requested two-sided proposal. However, to improve the security of the protected data included in the dynamic order (e.g., the identity of the originator, the intention to buy or sell the security interest, and/or the originator's reserve price) the execution system withholds (or otherwise hides/obfuscates) the confidential data from access by, or transmission to, the respondent system. Instead, the respondent system is only provided access to the unprotected data related to the security interest being offered for exchange and various other data necessary to make a bid and offer, such as a benchmark asset, in the case of a fixed-income instrument. In other words, the execution system hides from the respondent system the reserve price and the originator system's intention to buy or sell. By bifurcating the data associated with the dynamic order into protected data and unprotected data and subsequently obfuscating the protected data from access or view by a third party, the execution system improves data security of current, dynamic underlyer order management systems. Obfuscating protected data improves data security by restricting access of sensitive or confidential information to the systems that require the sensitive or confidential information, according to an embodiment. Obfuscating protected data from access or view also allows discrete servers (e.g., both originators and respondents) to access the same execution engine to interact with the same dynamic order (e.g., originate, edit, respond to) without the need to make additional transmissions of data between the servers, thus decreasing the likelihood of interception. This paradigm may additionally decrease both the amount of electronic data storage required by the various servers (e.g., the protected and unprotected data can be stored in one location rather than multiple) and decrease network congestion.

The respondent system provides the two-sided response to the execution system, and the execution system hides the two-sided response from the originator system's access. The execution system, upon receiving the two-sided response, compares the reserve price of the originator system to the offer/bid of the respondent system. By way of example, the execution system may receive the reserve price from the originator system as a number of basis points from a benchmark's value. Likewise, the execution system may receive the offer/bid from the respondent system as a number of basis points from the benchmark's value. However, these basis points are provided to the execution system at two different points in time, which may correspond with two different benchmark values. To rectify this discrepancy, the execution system converts the basis points to monetary values based on the benchmark value at the close of a solicitation period in which the respondent system is permitted to respond to the dynamic order. If the reserve monetary price is satisfied by a bid/offer (whichever corresponds to the hidden order type), the execution engine initiates the exchange through a clearing agency.

If the reserve price is not satisfied by the respondent system's bid/offer, a midpoint between the reserve monetary price and the corresponding bid/offer (as determined at the end of the solicitation period) is sent to both the originator system and the respondent system as a counteroffer to both. If both the originator system and the respondent system respond by accepting the midpoint, the execution system executes the dynamic order, as described above. If either the originator system or the respondent system rejects the counteroffer, the dynamic order is not executed.

In addition, the systems and methods discussed herein provide a description of modeling portfolios for improving bond ETF identification and selection for acquisition.

By way of example, a portfolio (e.g., a bond portfolio) is provided to an application hosted on an execution system. The portfolio may be made up of varying amounts of various individual bonds. The application models the portfolio as a single, weighted-value price (using the methods and techniques described herein) and reiterates this modeling for the previous 35 days (or another statistically significant amount of time). These 35 single, weighted-value prices are compared to the 35 previous closing-day costs of one or more ETFs (e.g., bond ETFs). A determination coefficient ($R^2$) is calculated for the ETF, as compared to the single, weighted-value prices of the portfolio. This determination coefficient is then provided to an account manager, through an originator system, for review. With this information, the account manager may then execute a trade for one or more options of the ETF if the determination coefficient is sufficiently high. In some embodiments, the execution system automatically executes the trade upon a threshold of invariability being satisfied.

In one implementation of the methods and systems discussed herein, the systems and methods described herein enable an originator to provide various data to an execution system to originate and transmit a dynamic order request to numerous respondents instantaneously. The various data provided by the originator are bifurcated into protected data and unprotected data. Exemplary protected data may include a reserve execution value, an indication of a desire to buy/sell, and a party's identity. The execution system transmits the dynamic order request to one or more respondents but, in so doing, obfuscates (e.g., hides) the protected data from the respondents, thus only displaying the unprotected data. Likewise, the respondent's response to the exchange request is protected from display to the originator unless a response satisfies an authorization threshold (e.g., the reserve execution threshold), thus protecting the anonymity of the users, entities, and responses. By obfuscating the protected data on both sides of the dynamic order, the potential for parties to take advantage of leaked information is reduced. Additionally, the systems and methods for obfuscating the protected data mitigate the opportunity for bad actors to take preemptive actions relating to the protected data. By obfuscating the protected data, no information that can be preemptively acted upon is provided to any parties, thus improving, through technical improvements, the field of dynamic order management.

Additional technical improvements of the methods and systems methods and systems discussed herein relate to the field of dynamic order management in the event that no match is determined between an originator's dynamic order and a respondent's proposed offer/bid. Using the methods and systems discussed herein, unlike in traditional order requests, the order from an originator is dynamic, as is the management of the order. In other words, the order request and the associated responses are compared to each other based on an indicated amount of basis points from a standard underlyer (e.g., a benchmark) at the conclusion of a solicitation period for responses. Traditional order management paradigms compare the originator's reserve execution threshold to responses based either on a static standard underlyer amount (e.g., the value of the standard at the time of origination of the request) or at varying times (e.g., comparing a reserve execution threshold based on a standard underlyer amount at the time of origination against a response execution value based on a standard underlyer amount at the time of response). The methods and systems discussed herein, a match may be determined at the close of the solicitation period, because underlyers (e.g., standard underlyers, such as the U.S. Treasury Bond) change over time. To capture this change over time and provide meaningful, mediated counter offers to the parties when no response satisfies the order, a mediated value (e.g., a midpoint) is determined between the originator's offer (based on the standard underlyer value at the conclusion of the solicitation period) and the respondent's response (based on the standard underlyer value at the conclusion of the solicitation period).

In another implementation of the methods and systems discussed herein, the systems and methods described herein enable managers of a product (e.g., a bond portfolio) made up of various subproducts (e.g., individual bonds) to efficiently, accurately, and timely determine corresponding products (e.g., bond ETFs) of high invariability in relation to the managed product by uniquely modeling the product as a single unit. By uniquely modeling the product as a single unit, as described below, the highly complex, traditional methods of product analysis are greatly reduced, allowing computing devices to more efficiently determine invariability between the complex product and potential corresponding products, thus conserving processing power and data memory associated with traditional analysis. This becomes increasingly important as the amount of data available to modeling programs becomes increasingly expansive in volume.

In addition to increasing computational efficiency, the unique modeling methods described herein allow for increased monetary efficiency. By modeling the product as a single unit, the various subproducts can be compared directly to other corresponding products composed of various corresponding subproducts. This allows for a user to select a single corresponding product (e.g., the bond ETF) to acquire an interest in (e.g., an option), as opposed to choosing numerous individual corresponding subproducts, each with associated outlays and complexity. This single selection results in decreased complexity and processing outlays associated with the acquisition and maintenance of a selected corresponding product, thus improving traditional methods of identification and selection of corresponding products. The systems and methods of uniquely modeling the provider product also increase the accuracy of the analysis over traditional methods by providing, at times, unconventional or surprising results. Timing and identification/selection of corresponding products are oftentimes critical, as the managed product changes in overall value over time. Wasted time resulting in loss of value in the product is reduced by a disclosed system that automatically identifies one or more corresponding products satisfying one or more thresholds at regular intervals and automatically executes a selection of the identified one or more corresponding products upon identification.

In some aspects, the techniques described herein relate to a computer-implemented method for data protection during dynamic relational order management, the computer-implemented method including: receiving, by one or more processors, a data feed and a dynamic order including a plurality of order attributes bifurcating, by the one or more processors, the plurality of order attributes of the dynamic order into a protected dataset and an unprotected dataset, the protected dataset including at least a request type and a reserve execution threshold; obfuscating, by the one or more processors, the protected dataset from display on a respondent system; transmitting, by the one or more processors to the respondent system, instructions to present for display a proposal request dataset for executing the dynamic order, the proposal request dataset including the unprotected dataset and the data feed; receiving, by the one or more processors from the respondent system, a proposal response dataset for executing the dynamic order, the proposal response dataset including a first execution value associated with an amount to execute the dynamic order and a second execution value associated with an amount to execute the dynamic order; generating, by the one or more processors, an adjusted reserve execution threshold, an adjusted first execution value, and an adjusted second execution value; and performing, by the one or more processors, an execution action in response to the adjusted first execution value or the adjusted second execution value satisfying the adjusted reserve execution threshold.

In some aspects, the techniques described herein relate to a computer-implemented method, further including generating, by the one or more processors, the proposal request dataset, the data feed of the proposal request dataset including: a current amount of a standard underlyer; and a yield to maturity value associated with a standard value and the dynamic order.

In some aspects, the techniques described herein relate to a computer-implemented method, wherein: the first execution value of the proposal response dataset corresponding to a bid to execute the dynamic order is a first amount of basis points above or below a first yield to maturity value at a time of response; the second execution value of the proposal response dataset corresponding to an offer to execute the dynamic order is a second amount of basis points above or below the first yield to maturity value at the time of response; and the reserve execution threshold is a third amount of basis points above or below a second yield to maturity value associated with the yield to maturity at a time of origination.

In some aspects, the techniques described herein relate to a computer-implemented method, wherein: the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order; the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

In some aspects, the techniques described herein relate to a computer-implemented method, wherein the standard underlyer is a fixed-disbursement underlyer including one or more of an investment-grade bond, a high-yield corporate bond, a U.S. Treasury bond, a municipal bond, a U.S. agency bond, and a mortgage bond.

In some aspects, the techniques described herein relate to a computer-implemented method, wherein the unprotected dataset of the dynamic order includes an issuer, a coupon, a maturity date, a number of bonds, and a standard underlyer.

In some aspects, the techniques described herein relate to a computer-implemented method, wherein the protected dataset further includes an identity of an entity originating the dynamic order.

In some aspects, the techniques described herein relate to a computer-implemented method, wherein obfuscating the protected dataset includes one or more of removing the protected dataset from a transmitted data packet, adjusting an HTML instruction, hiding from display, masking, and intercepting the protected dataset from transmittal.

In some aspects, the techniques described herein relate to a computer-implemented method, further including: generating, by the one or more processors, instructions to display on a client device one or more content items associated with the dynamic order and one or more selectable objects for input by an originator system of one or more of the plurality of order attributes.

In some aspects, the techniques described herein relate to a computer-implemented method, further including: receiving, by the one or more processors from a second respondent system, a second proposal response dataset; and obfuscating, by the one or more processors, the proposal response dataset and the second proposal response dataset from display to an originator system and the respondent system.

In some aspects, the techniques described herein relate to a computer-implemented method, wherein performing the execution action further includes: in response to the adjusted first execution value or the adjusted second execution value satisfying the adjusted reserve execution threshold, generating, by the one or more processors, an instruction to execute the dynamic order, wherein the satisfying adjusted first execution value or the satisfying adjusted second execution value corresponds with the request type; transmitting, by the one or more processors, the instruction to an exchange system to execute the dynamic order at the satisfying adjusted first execution value or the satisfying adjusted second execution value; in response to neither the adjusted first execution value nor the adjusted second execution value satisfying the adjusted reserve execution threshold, determining, by the one or more processors, a mediated execution value; transmitting, by the one or more processors to an originator system and the respondent system, for display, the mediated execution value; and in response to receiving, by the one or more processors, a first acceptance of the mediated execution value by the originator system and a second acceptance of the mediated execution value by the respondent system, transmitting, by the one or more processors, a second instruction to the exchange system to execute the dynamic order at the mediated execution value.

In some aspects, the techniques described herein relate to a non-transitory, computer-readable medium containing instructions for causing one or more processors to perform a method including: receiving a data feed and a dynamic order including a plurality of order attributes; bifurcating, by the one or more processors, the plurality of order attributes of the dynamic order into a protected dataset and an unprotected dataset, the protected dataset including at least a request type and a reserve execution threshold; obfuscating the protected dataset from display on a respondent system; transmitting, to the respondent system, display instructions to present for display a proposal request dataset for executing the dynamic order, the proposal request dataset including the unprotected dataset and the data feed; receiving, from the respondent system, a proposal response dataset for executing the dynamic order, the proposal response dataset including a first execution value associated with an amount to execute the dynamic order and a second execution value associated with an amount to execute the dynamic order; generating an adjusted reserve execution threshold, an adjusted first execution value, and an adjusted second execution value; and performing an execution action in response to the adjusted first execution value or the adjusted second execution value satisfying the adjusted reserve execution threshold.

In some aspects, the techniques described herein relate to a non-transitory, computer-readable medium, the method further including: generating the proposal request dataset, the data feed of the proposal request dataset including: a current amount of a standard underlyer; and a yield to maturity value associated with a standard value and the dynamic order.

In some aspects, the techniques described herein relate to a non-transitory, computer-readable medium, wherein: the first execution value of the proposal response dataset corresponding to a bid to execute the dynamic order is a first amount of basis points above or below a first yield to maturity value at a time of response; the second execution value of the proposal response dataset corresponding to an offer to execute the dynamic order is a second amount of basis points above or below the first yield to maturity value at the time of response; and the reserve execution threshold is a third amount of basis points above or below a second yield to maturity value associated with the yield to maturity at a time of origination.

In some aspects, the techniques described herein relate to a non-transitory, computer-readable medium, wherein: the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order; the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

In some aspects, the techniques described herein relate to a non-transitory, computer-readable medium, the method further including: in response to the adjusted first execution value or the adjusted second execution value satisfying the adjusted reserve execution threshold, generating an instruction to execute the dynamic order, wherein the satisfying adjusted first execution value or the satisfying adjusted second execution value corresponds with the request type; transmitting the instruction to an exchange system to execute the dynamic order at the satisfying adjusted first execution value or the satisfying adjusted second execution value; in response to neither the adjusted first execution value nor the adjusted second execution value satisfying the adjusted reserve execution threshold, determining a mediated execution value; transmitting to an originator system and the respondent system, for display, the mediated execution value; and in response to receiving a first acceptance of the mediated execution value by the originator system and a second acceptance of the mediated execution value by the respondent system, transmitting a second instruction to the exchange system to execute the dynamic order at the mediated execution value.

In some aspects, the techniques described herein relate to a system including: a display; one or more processors; and a non-transitory, computer-readable medium containing instructions that when executed by the one or more processors cause the one or more processors to perform operations including: receiving a data feed and a dynamic order including a plurality of order attributes; bifurcating, by the one or more processors, the plurality of order attributes of the dynamic order into a protected dataset and an unprotected dataset, the protected dataset including at least a request type and a reserve execution threshold; obfuscating the protected dataset from display on a respondent system; transmitting, to the respondent system, display instructions to present for display a proposal request dataset for executing the dynamic order, the proposal request dataset including the unprotected dataset and the data feed; receiving, from the respondent system, a proposal response dataset for executing the dynamic order, the proposal response dataset including a first execution value associated with an amount to execute the dynamic order and a second execution value associated with an amount to execute the dynamic order; generating an adjusted reserve execution threshold, an adjusted first execution value, and an adjusted second execution value; and performing an execution action in response to the adjusted first execution value or the adjusted second execution value satisfying the adjusted reserve execution threshold.

In some aspects, the techniques described herein relate to a system, the operations further including: generating the proposal request dataset, the data feed of the proposal request dataset including: a current amount of a standard underlyer; and a yield to maturity value associated with a standard value and the dynamic order.

In some aspects, the techniques described herein relate to a system, wherein: the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order; the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

In some aspects, the techniques described herein relate to a system, the operations further including: in response to the adjusted first execution value or the adjusted second execution value satisfying the adjusted reserve execution threshold, generating an instruction to execute the dynamic order, wherein the satisfying adjusted first execution value or the satisfying adjusted second execution value corresponds with the request type; transmitting the instruction to an exchange system to execute the dynamic order at the satisfying adjusted first execution value or the satisfying adjusted second execution value; in response to neither the adjusted first execution value nor the adjusted second execution value satisfying the adjusted reserve execution threshold, determining a mediated execution value; transmitting to an originator system and the respondent system, for display, the mediated execution value; and in response to receiving a first acceptance."

In some aspects, the techniques described herein relate to a computer-implemented method including: receiving, by one or more processors, a product dataset associated with a product including one or more subproducts, a first corresponding product dataset associated with a first corresponding product, and a second corresponding product dataset associated with a second corresponding product; determining, by the one or more processors, a product model output corresponding to the product, wherein the product model output is a single, value-weighted indicator of the product; determining, by the one or more processors, a first variability index corresponding to the first corresponding product based at least on the product model output and the first corresponding product dataset, and a second variability index corresponding to the second corresponding product based at least on the product model output and the second corresponding product dataset; and displaying, by the one or more processors, a visual indicator on a graphical user interface the first variability index and the second variability index.

In some aspects, the techniques described herein relate to a computer-implemented method, wherein the first corresponding product includes a plurality of first corresponding subproducts, and the second corresponding product includes a plurality of second corresponding subproducts.

In some aspects, the techniques described herein relate to a computer-implemented method, further including: receiving, by the one or more processors, a variability threshold; and responsive to the first variability index satisfying the variability threshold and indicating less variability than the second variability index, transmitting, by the one or more processors to an exchange system, an instruction to trade the first corresponding product.

In some aspects, the techniques described herein relate to a computer-implemented method, further including: receiving, by the one or more processors, a variability threshold; responsive to the first variability index not satisfying the variability threshold, generating, by the one or more processors, an adjusted first corresponding product by adjusting one or more of the plurality of first corresponding subproducts, wherein the first corresponding product is a currently owned corresponding product; determining, by the one or more processors, a first corresponding product model output corresponding to the adjusted first corresponding product; determining, by the one or more processors, an adjusted first variability index corresponding to the adjusted first corresponding product based at least on the product model output and the first corresponding product model output; and responsive to the adjusted first variability index satisfying the variability threshold, transmitting, by the one or more processors to an exchange system, an instruction to exchange the first corresponding product with the adjusted first corresponding product.

In some aspects, the techniques described herein relate to a computer-implemented method, wherein the instruction to exchange of the currently owned corresponding product with the adjusted first corresponding product includes instructions to exchange one or more individual first corresponding subproducts of the first corresponding product with one or more individual subproducts of the product.

In some aspects, the techniques described herein relate to a computer-implemented method, wherein the product model output is the single, value-weighted indicator of the one or more subproducts of the product.

In some aspects, the techniques described herein relate to a computer-implemented method, wherein the product model output is a historical trend of single, value-weighted indicators of the one or more subproducts of the product over a statistically significant period of time.

In some aspects, the techniques described herein relate to a computer-implemented method, wherein the exchange system is a clearing agency.

In some aspects, the techniques described herein relate to a computer-implemented method, wherein the first variability index is a measure of variability between the product and the first corresponding product, and the second variability index is a measure of variability between the product and the second corresponding product.

In some aspects, the techniques described herein relate to a computer-implemented method, wherein the first variability index and the second variability index are determined at a regular time intervals.

In some aspects, the techniques described herein relate to a non-transitory, computer-readable medium containing instructions for causing one or more processors to perform a method including: receiving, by one or more processors, a product dataset associated with a product including one or more subproducts, a first corresponding product dataset associated with a first corresponding product, and a second corresponding product dataset associated with a second corresponding product; determining, by the one or more processors, a product model output corresponding to the product; determining, by the one or more processors, a first variability index corresponding to the first corresponding product based at least on the product model output and the first corresponding product dataset, and a second variability index corresponding to the second corresponding product based at least on the product model output and the second corresponding product dataset; and displaying, by the one or more processors, a visual indicator on a graphical user interface the first variability index and the second variability index.

In some aspects, the techniques described herein relate to a non-transitory, computer-readable medium, wherein the first corresponding product includes a plurality of first corresponding subproducts, and the second corresponding product includes a plurality of second corresponding subproducts.

In some aspects, the techniques described herein relate to a non-transitory, computer-readable medium, the method further including: receiving, by the one or more processors, a variability threshold; and responsive to the first variability index satisfying the variability threshold and indicating less variability than the second variability index, transmitting, by the one or more processors to an exchange system, an instruction to trade the first corresponding product.

In some aspects, the techniques described herein relate to a non-transitory, computer-readable medium, the method further including: receiving, by the one or more processors, a variability threshold; responsive to the first variability index not satisfying the variability threshold, generating, by the one or more processors, an adjusted first corresponding product by adjusting one or more of the plurality of first corresponding subproducts, wherein the first corresponding product is a currently owned corresponding product; determining, by the one or more processors, a first corresponding product model output corresponding to the adjusted first corresponding product; determining, by the one or more processors, an adjusted first variability index corresponding to the adjusted first corresponding product based at least on the product model output and the first corresponding product model output; and responsive to the adjusted first variability index satisfying the variability threshold, transmitting, by the one or more processors to an exchange system, an instruction to exchange the first corresponding product with the adjusted first corresponding product.

In some aspects, the techniques described herein relate to a non-transitory, computer-readable medium, wherein the instruction to exchange of the currently owned corresponding product with the adjusted first corresponding product includes instructions to exchange one or more individual first corresponding subproducts of the first corresponding product with one or more individual subproducts of the product.

In some aspects, the techniques described herein relate to a non-transitory, computer-readable medium, wherein the product model output is a single, value-weighted indicator of the one or more subproducts of the product.

In some aspects, the techniques described herein relate to a non-transitory, computer-readable medium, wherein the product model output is a historical trend of single, value-weighted indicators of the one or more subproducts of the product over a statistically significant period of time.

In some aspects, the techniques described herein relate to a non-transitory, computer-readable medium, wherein the exchange system is a clearing agency.

In some aspects, the techniques described herein relate to a non-transitory, computer-readable medium, wherein the first variability index is a measure of variability between the product and the first corresponding product, and the second variability index is a measure of variability between the product and the second corresponding product.

In some aspects, the techniques described herein relate to a non-transitory, computer-readable medium, wherein the first variability index and the second variability index are determined at a regular time intervals.

Additional features and advantages of various embodiments will be set forth in the description which follows, and in part will be apparent from the description. Other advantages will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The embodiments described herein solve various paint points and shortcomings of traditional, dynamic relational order management (referred to herein as dynamic order management) and maintenance including, but not limited to, providing dynamic relational adjustments to dynamic orders of fixed- and non-fixed-distribution underlyers and increasing data security during execution of the dynamic orders. In addition, the embodiments described herein provide for systems, modeling, and methods of improving an identification and selection of corresponding products.

Figure 1:
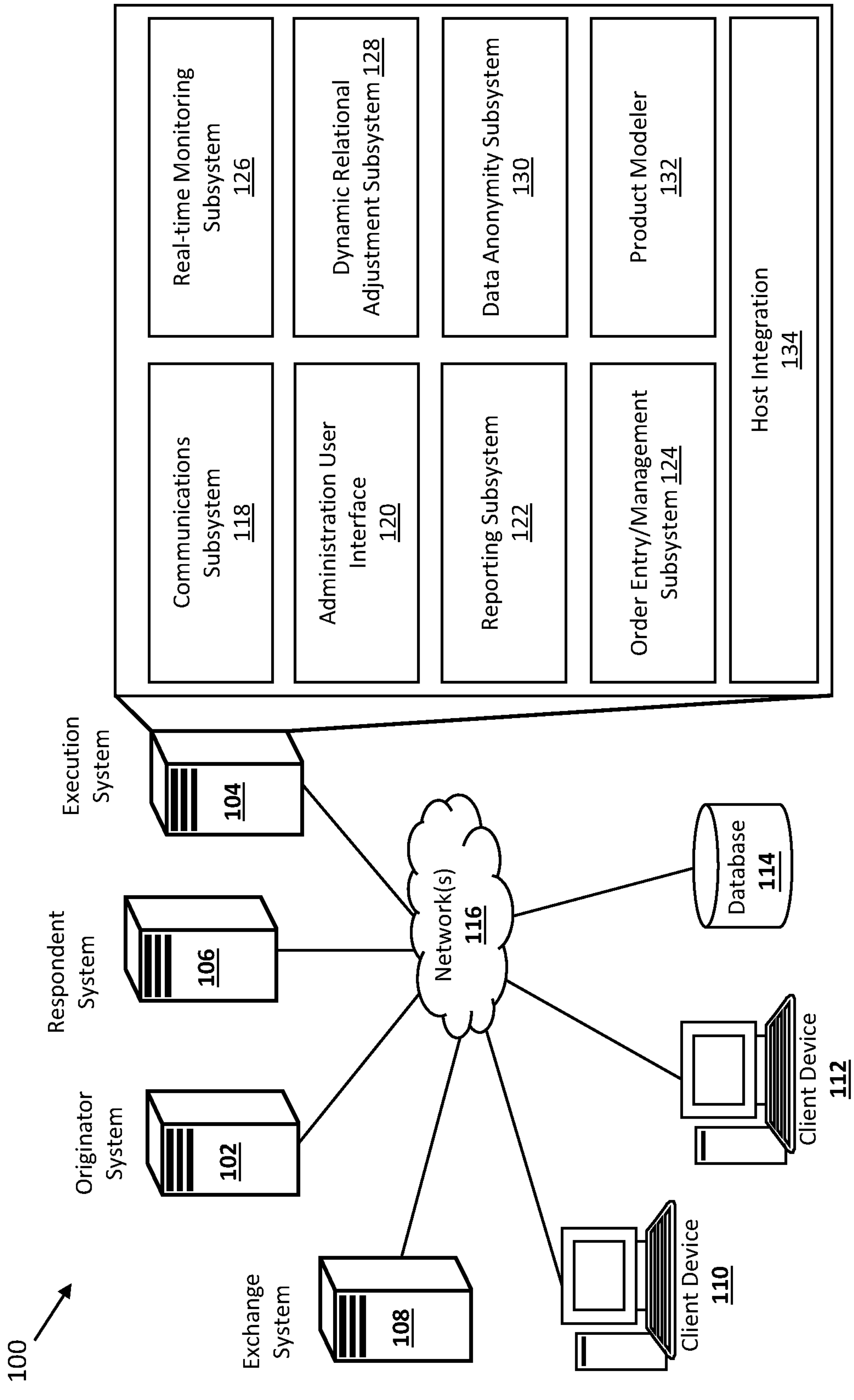
FIG. 1 illustrates a block diagram of a network environment, according to an embodiment.

Referring to FIG. 1, a data protection architecture 100 is shown to include an originator system 102, an execution system 104, a respondent system 106, an exchange system 108, one or more client devices 110, 112, a database 114, and a network 116. The execution system 104 may further include various systems, subsystems, components, modules, engines, etc., as described in further detail herein.

For ease of description and understanding, FIG. 1 depicts the data protection architecture 100 as having only one or a small number of each component. Embodiments may however, comprise additional or alternative components, or omit certain components, from those of FIG. 1 and still fall within the scope of this disclosure. As an example, it may be common for embodiments to include multiple originator systems 102, multiple execution systems 104, multiple respondent systems 106, multiple exchange systems, multiple client devices 110, 112, and/or multiple databases 114 that are communicably coupled to the execution system 104 and each other through the network 116. In at least one embodiment, the network 116 is a data network. Embodiments may include or otherwise implement any number of devices capable of performing the various features and tasks described herein. For instance, FIG. 1 depicts the database 114 as hosted as a distinct computing device from the execution system 104, though, in some embodiments, execution system 104 may include an integrated database 114 hosted by the execution system 104.

The data protection architecture 100 includes one or more networks 116, which may include any number of internal networks, external networks, private networks (e.g., intranets, VPNs), and public networks (e.g., Internet). The network 116 comprises various hardware and software components for hosting and conducting communications amongst the components of the data protection architecture 100. Non-limiting examples of such internal or external network 116 may include a Local Area Network (LAN), Wireless Local Area Network (WLAN), Metropolitan Area Network (MAN), Wide Area Network (WAN), and the Internet. The communication over the network 116 may be performed in accordance with various communication protocols, such as Transmission Control Protocol and Internet Protocol (TCP/IP), User Datagram Protocol (UDP), and IEEE communication protocols, among others.

The client device 110 may be any type of electronic device comprising hardware components (e.g., one or more processors, non-transitory storage) and software components capable of performing the various processes and tasks described herein. Non-limiting examples of the client device 110 include personal computers (e.g., laptop computers, desktop computers), server computers, mobile devices (e.g., smartphones, tablets), VR devices, gaming consoles, and smart watches, among other types of electronic devices. In some embodiments, the client device 110 is associated with an originator entity and used to access and/or execute various applications, methods, or processes on the originator system 102 or the execution system 104, as described herein. However, in certain embodiments, the client device 110 may be associated with a respondent entity and used to access and/or execute various applications, methods, or processes on the respondent system 106 or the execution system 104. In other embodiments, the client device 110 may be used in one instance to access and execute the originator system 102 and, in a second instance, access and execute the respondent system 106. In various embodiments, the client device 112 may be substantially similar to the client device 110.

Figure 5:
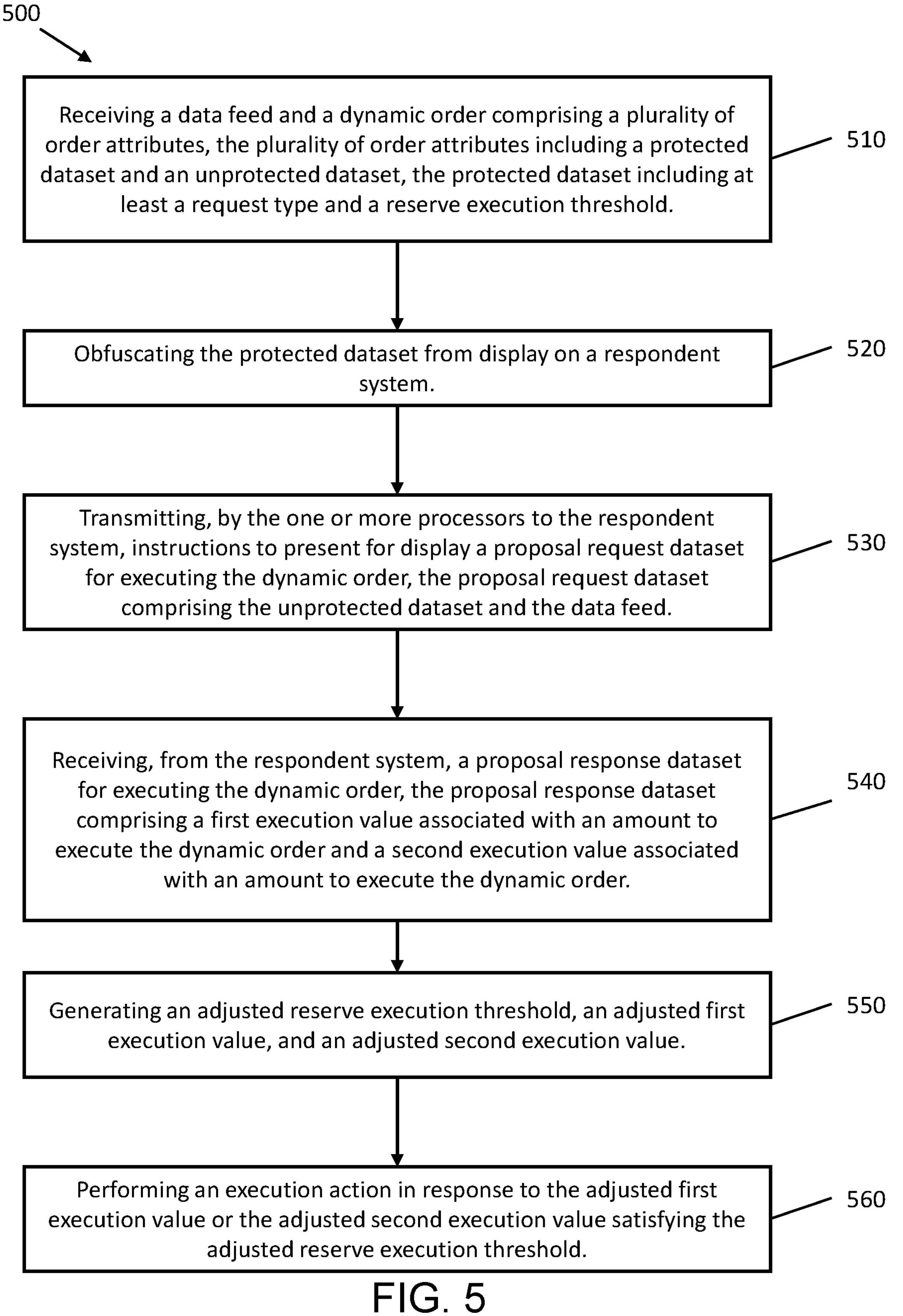
FIG. 5 depicts a flow chart describing one or more processes described herein, according to an embodiment.
Figure 6:
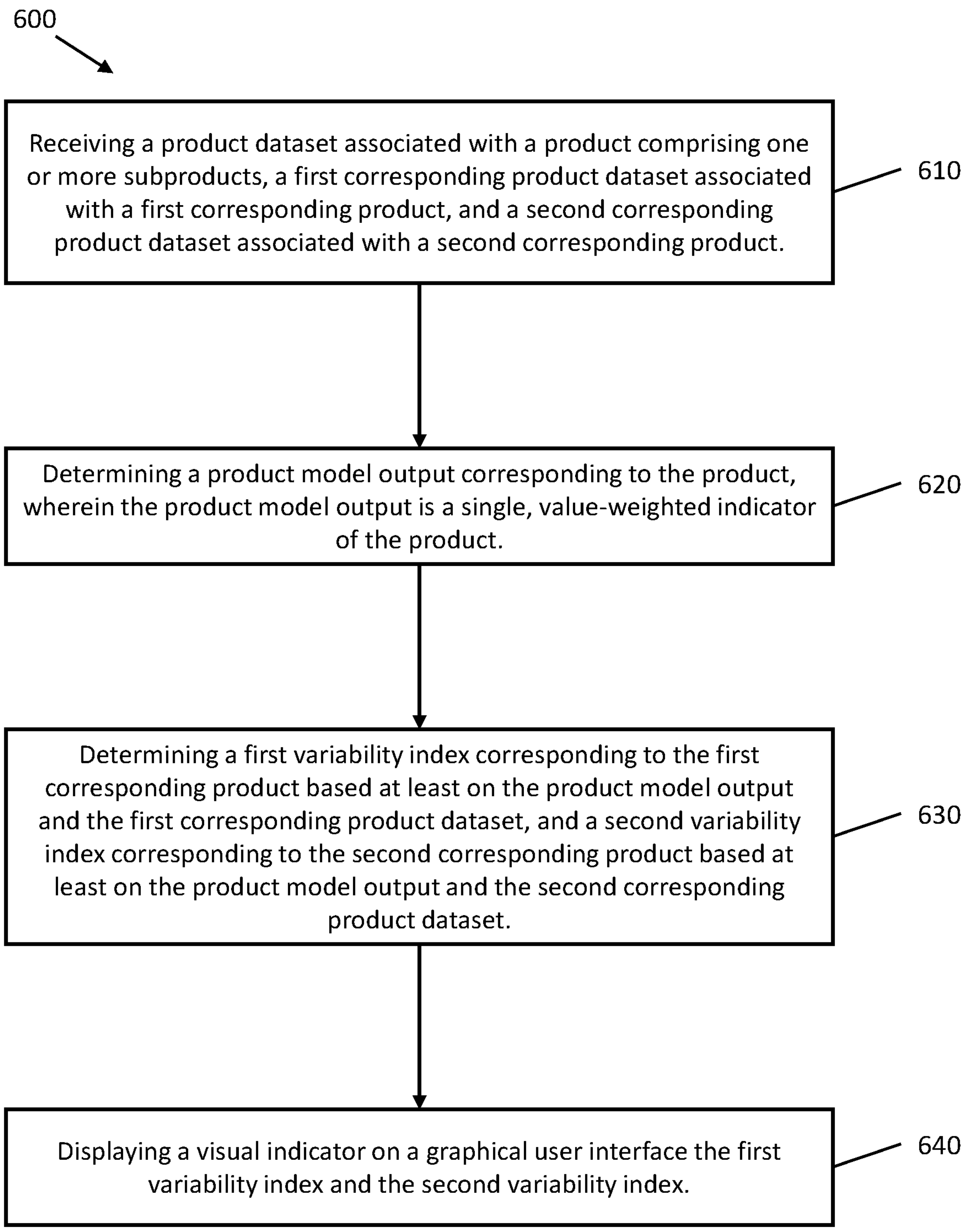
FIG. 6 depicts a flow chart describing one or more processes described herein, according to an embodiment.

The originator system 102 may execute one or more software programs to perform various methods and processes (e.g., the method 500 of FIG. 5, and/or the method 600 of FIG. 6). The originator system 102 may include one or more computing devices configured to perform various processes and operations disclosed herein. In some embodiments, the originator system 102 may be a computer, server, or other computing device capable of performing the methods disclosed herein. The originator system 102 may include a processor and non-transitory, computer-readable medium, including instructions, which, when executed by the processor, cause the processor to perform one or more methods disclosed herein. The processor may include any number of physical, hardware processors. Although FIG. 1 shows only a single originator system 102, the originator system 102 may include any number of computing devices. In some cases, the computing devices of the originator system 102 may perform all or portions of the processes and benefits of the originator system 102. The originator system 102 may comprise computing devices operating in a distributed or cloud computing configuration and/or in a virtual machine configuration. It should also be appreciated that, in some embodiments, functions of the originator system 102 may be partly or entirely performed by the execution system 104, the respondent system 106, the exchange system 108, and/or the client device 110, 112.

The originator system 102 is preferably responsible for developing and generating a dynamic order (e.g., a dynamic relational order request, a dynamic order request, or an order request) and initiating the transfer of the dynamic order directly and/or indirectly to the execution system 104, while the execution system 104 is preferably responsible for identifying whether the dynamic order is executable (and, in some circumstances, executing the dynamic order). It is contemplated that the originator system 102 is operated, used, and/or managed by an originator (e.g., a "liquidity supplier"), while the execution system 104 is operated, used, and/or managed by an agent or sponsor of the originator and charged with initiating execution of the dynamic order. However, the originator system 102 may also be operated, used, and/or managed by a liquidity requester.

The originator system 102 includes hardware and/or software suitable for implementing development, creation, and/or transfer initiation of the dynamic order. For example, the originator system 102 may be in communication with the client device 110 or a plurality of client devices 110. Each one of the client devices 110 includes hardware components such as an electronic processor, an electronic memory device, an input device (mouse, keyboard, etc.), a display device, a network interface device, etc., and is a node along a wired and/or wireless communication line, such as an originator subnet.

The execution system 104 may execute one or more software programs to perform various methods and processes (e.g., the method 500 of FIG. 5, and/or the method 600 of FIG. 6).). The execution system 104 may include one or more computing devices configured to perform various processes and operations disclosed herein. In some embodiments, the execution system 104 may be a computer, server, or other computing device capable of performing the methods disclosed herein. The execution system 104 may include a processor and non-transitory, computer-readable medium including instructions, which, when executed by the processor, cause the processor to perform one or more methods disclosed herein. The processor may include any number of physical, hardware processors. Although FIG. 1 shows only a single execution system 104, the execution system 104 may include any number of computing devices. In some cases, the computing devices of the execution system 104 may perform all or portions of the processes and benefits of the execution system 104. The execution system 104 may comprise computing devices operating in a distributed or cloud computing configuration and/or in a virtual machine configuration. It should also be appreciated that, in some embodiments, functions of the execution system 104 may be partly or entirely performed by the originator system 102, the respondent system 106, the exchange system 108, and/or the client device 110, 112.

Continuing with reference to FIG. 1, the execution system 104 includes hardware and/or software suitable for receiving the dynamic order from the originator system 102 and a product data feed (e.g., current product values, yield to maturity values ("YTM"), etc.), and identifying if the dynamic order is executable, e.g., authorized. For example, the execution system 104 may include at least one executor-side computer terminal or a plurality of executor-side computer terminals. Each one of the executor-side computer terminals may include hardware components such as an electronic processor, an electronic memory device, an input device (mouse, keyboard, etc.), a display device, a network interface device, etc., and is a node along a wired and/or wireless communication line, such as an execution subnet.

A system for generating the product data feed is provided (not shown). The execution system 104 is adapted to receive the product data feed and extract the data thereof to manage the dynamic order. The data protection architecture 100 can include additional and/or alternative hardware and/or software systems.

The execution system 104 may include various modules, engines, and/or subsystems for executing the various methods and processes described herein. For example, the execution system 104 may include (1) a communications subsystem 118 for facilitating communication of the dynamic order between the originator system 102, the execution system 104, and/or the respondent system 106 through the network 116 in a common protocol, such as the financial information exchange (FIX) protocol or other communications protocol used to facilitate the exchange of financial transactional information; (2) an administration user interface 120 for facilitating input and output of information to users of the originator system 102, the execution system 104, and/or the respondent system 106; (3) a reporting subsystem 122 for generating paper (and/or electronic) reports concerning the dynamic order; (4) an order entry/management subsystem 124 for managing and maintaining the order attributes and attribute relationships; (5) a real-time monitoring subsystem 126 for polling the financial data feed and extracting data thereof corresponding to an underlyer order attribute of the dynamic order, such as the corresponding data feed underlyer price; (6) a dynamic relational adjustment subsystem 128 for dynamically adjusting the transmitted reserve execution threshold and execution values for comparison at the conclusion of a solicitation period; (7) a data anonymity subsystem 130 for bifurcating and obfuscating protected data from unprotected data; (8) a product modeler 132 for modeling products and corresponding products for efficient comparison; and/or (9) a host integration 134 for compatibility purposes, for example, integrating the various subsystems 118-132 with the operating system and other hardware and/or software of the originator system 102, the execution system 104, and/or the respondent system 106. It should be understood that while the various subsystems are shown as resident on the execution system 104, any and all of the subsystems 118-134 may be resident on one or more of the originator system 102, execution system 104, respondent system 106, and/or the exchange system 108.

The respondent system 106 may execute one or more software programs to perform various methods and processes (e.g., the method 500 of FIG. 5, and/or the method 600 of FIG. 6).). The respondent system 106 may include one or more computing devices configured to perform various processes and operations disclosed herein. In some embodiments, the respondent system 106 may be a computer, server, or other computing device capable of performing the methods disclosed herein. The respondent system 106 may include a processor and non-transitory, computer-readable medium, including instructions, which, when executed by the processor, cause the processor to perform one or more methods disclosed herein. The processor may include any number of physical, hardware processors. Although FIG. 1 shows only a single respondent system 106, the respondent system 106 may include any number of computing devices. In some cases, the computing devices of the respondent system 106 may perform all or portions of the processes and benefits of the respondent system 106. The respondent system 106 may comprise computing devices operating in a distributed or cloud computing configuration and/or in a virtual machine configuration. It should also be appreciated that, in some embodiments, functions of the respondent system 106 may be partly or entirely performed by the originator system 102, execution system 104, the exchange system 108, and/or the client device 110, 112.

The respondent system 106 is preferably responsible for responding to the dynamic order (e.g., a dynamic relational order request), as transmitted to the respondent system 106 by the execution system 104 as a proposal request dataset. The respondent system 106 responds to the dynamic order with a proposal response dataset for executing the dynamic order and initiating a transfer of the proposal response dataset directly and/or indirectly to the execution system 104, while the execution system 104 is preferably responsible for identifying whether the dynamic order is executable (and, in some circumstances, executing the dynamic order) upon the proposal response dataset satisfying the dynamic order. The proposal response dataset may include, but is not limited to, a first execution value associated with a proposal to execute the dynamic order as a liquidity provider (e.g., a bid) and a second execution value associated with a proposal to execute the dynamic order as a liquidity requester (e.g., an offer). In some embodiments, the first execution value is presented by the respondent system 106 as a number of basis points above or below a current YTM value of the standard provider product.

It is contemplated that the respondent system 106 is operated, used, and/or managed by a respondent (e.g., a "liquidity requester"), and the execution system 104 is operated, used, and/or managed by an agent or sponsor of the originator and charged with initiating execution of the dynamic order. However, it should be understood that the respondent system 106 may also be operated, used, and/or managed by a liquidity provider.

The originator system 102 includes hardware and/or software suitable for implementing development, creation, and/or transfer initiation of the proposal response dataset. For example, the originator system 102 may be in communication with the client device 112 or a plurality of client devices 110. Each one of the client devices 110 includes hardware components such as an electronic processor, an electronic memory device, an input device (mouse, keyboard, etc.), a display device, a network interface device, etc., and is a node along a wired and/or wireless communication line, such as a respondent subnet.

The exchange system 108 may execute one or more software programs to perform various methods and processes (e.g., the method 500 of FIG. 5, and/or the method 600 of FIG. 6). The exchange system 108 may include one or more computing devices configured to perform various processes and operations disclosed herein. In some embodiments, the exchange system 108 may be a computer, server, or other computing device capable of performing the methods disclosed herein. The exchange system 108 may include a processor and non-transitory, computer-readable medium, including instructions, which, when executed by the processor, cause the processor to perform one or more methods disclosed herein. The processor may include any number of physical, hardware processors. Although FIG. 1 shows only a single exchange system 108, the exchange system 108 may include any number of computing devices. In some cases, the computing devices of the exchange system 108 may perform all or portions of the processes and benefits of the exchange system 108. The exchange system 108 may comprise computing devices operating in a distributed or cloud computing configuration and/or in a virtual machine configuration. It should also be appreciated that, in some embodiments, functions of the exchange system 108 may be partly or entirely performed by the originator system 102, execution system 104, the respondent system 106, and/or the client device 110, 112. In various embodiments, the exchange system 108 is used, managed, and/or operated by a clearing agency responsible for facilitating security trading. In some embodiments, the clearing agency may be a registered Section 17 (of the 1934 Exchange Act) clearing agency with the SEC, a broker/dealer, an alternative trading system ("ATS"), and/or a Derivatives Clearing Organization registered with the Commodity Futures Trading Commission ("CFTC").

The client device 110 (and likewise, the client device 112) may execute one or more software programs to perform various methods and processes (e.g., the method 500 of FIG. 5, and/or the method 600 of FIG. 6). The client device 110 may include one or more computing devices configured to perform various processes and operations disclosed herein. In some embodiments, the client device 110 may be a computer or computing device capable of performing the methods disclosed herein. In some embodiments, the client device 110 may be a mobile computing device (e.g., a cellular device). The client device 110 may include a processor and non-transitory, computer-readable medium, including instructions, which, when executed by the processor, caused the processor to perform methods disclosed herein. The processor may include any number of physical, hardware processors. Although FIG. 1 shows only a single client device 110, the client device 110 any include any number of computing devices. In some cases, the computing devices of the client device 110 may perform all or portions of the processes and benefits of the client device 110. The client device 110 may comprise computing devices operating in a distributed or cloud computing configuration and/or in a virtual machine configuration. The client device 110 may be configured to execute some or all of the methods, processes, and functionality of the originator system 102, the execution system 104, the respondent system 106, and/or the exchange system 108.

The client device 110 may include one or more security measures to protect the contents and information stored on the client device 110 and or accessible through the client device 110. For example, the client device 110 may employ a username/password protocol to authenticate the user prior to the use of the client device 110. In some embodiments, the security measures may be employed upon initiation of the client device 110. In other embodiments, the security measures may be executed at the initiation of the mobile application. The security measures may include a password and username authentication, biometric authentication, token authentication, pin authentication, security question authentication, and/or any other means to authenticate the identity of the user. The client device 110 may store locally the security data (passwords, usernames, pins, security questions, tokens, biometric data, etc.) and access the stored data upon execution of the security protocols in order to authenticate one or more received security inputs. In other embodiments, the security information may be stored remotely (e.g., at database 114) and accessed through one or more networks 116. The electronic device may authenticate a user input into the client device 110 (e.g., through touch, sound, or image) by comparing the stored security authentication information with the user input.

The mobile application may be hosted and/or executed locally on the client device 110 or remotely on the originator system 102, the execution system 104, the respondent system 106, and/or the exchange system 108. The methods and systems described herein may be executed in substantially the same manner whether the mobile application is hosted and/or executed on the client device 110 locally or remotely on one or more of the originator system 102, the execution system 104, the respondent system 106, and/or the exchange system 108.

The database 114 may store various information from the originator system 102, the execution system 104, the respondent system 106, the exchange system 108, the client device 110, the client device 112, and/or some other data feed. Such information may include historical data (e.g., values) related to one or more standard underlyers (e.g., benchmark assets/instruments). In addition, database 114 may store various information from one or more external data sources.

Any suitable network topography for implementing the methods herein described can be utilized. For example, it is contemplated that the originator system having the functionality for implementing the methods herein described can include a single home computer system (desktop or laptop), such as the originator system 102 shown in FIG. 1, which is particularly suitable and efficient for individual users who desire to create and initiate transfer of a dynamic order.

At the originator system 102, a framework (e.g., a template, as described herein) is presented for dynamic order submission, in which a plurality of order attributes are provided by the originator system 102 and/or respondent system 106 to be aggregated into a dynamic order dataset and transmitted to the execution system 104, to then be provided and/or displayed, by the execution system 104, to one or more originator system 102 and/or respondent system 106. Depending on the type of order being requested by the originator system 102, various templates (referred to herein as a request template) may be presented for input at the originator system 102 in a graphical user interface ("GUI"), such as shown in various embodiments in FIGS. 4A-4S. In various embodiments, the GUI on the originator system 102 is accessed by the client device 110 and presented for display on the client device 110. The presented GUI may include various content items associated with the dynamic order and one or more selectable objects that may be interacted with (e.g., data inputted, clicked, selected, submitted) by the originator system 102 on the client device 110. The GUI (e.g., the dynamic order interface 400 of FIGS. 4A-4S) may include selectable objects for input by the originator system 102 of one or more of a plurality of order attributes of the dynamic order, as described herein. By way of example, the dynamic order may be associated with a first underlyer class (e.g., equities, futures, commodities, interest rates, foreign monetary exchange, interest rate swaps, etc.). In an embodiment in which the dynamic order is associated with the first underlyer class, the template may comprise various fields for receiving values and/or indications corresponding to various order attributes of the first underlyer class. For the first underlyer class, the order attributes for input may include an indication of the underlyer, strike, expiry, a put/call, contract, option type (e.g., American, European, other), AON, listed/flex, an implied volatility, and/or an execution threshold. The originator system 102 may require an input for one or all of these plurality of order attributes prior to generating the dynamic order dataset.

In an embodiment, the dynamic order may be associated with a request to trade an instrument in a second underlyer class. The second underlyer class may include, but is not limited to, instruments such as options on any of the standard underlyers, U.S. Treasury securities, corporate bonds, mortgage securities, U.S. Agency securities, municipal securities, futures contracts, commodities, an investment-grade bond, a high-yield corporate bond, a U.S. Treasury bond, a municipal bond, a U.S. Agency bond, and/or a mortgage bond. In embodiments in which the dynamic order is associated with the second underlyer class, the request template may comprise various fields for receiving (e.g., from the client device 110 of FIG. 1) values and/or indications corresponding to various order attributes of the second underlyer class. For the second underlyer class, the order attributes for input may include a CUSIP identifier and/or other identifying description of the underlyer, the number of products associated with the dynamic relational order request (e.g., a number of bonds), a standard underlyer (e.g., a benchmark asset/instrument), and/or an execution reserve threshold (e.g., an authorized amount, that if met by a respondent's proposal response, may cause an execution of the dynamic order).

Upon receipt, by the originator system 102, of some or all of the various order attributes above, the originator system 102 transmits the order attributes to the execution system 104. In some embodiments, the originator system 102 generates, for transmission, a dataset (e.g., the dynamic order dataset) comprising the various inputs corresponding to the order attributes above. The dynamic order dataset may include an indication of the order attribute along with the corresponding value or input.

Figure 2:
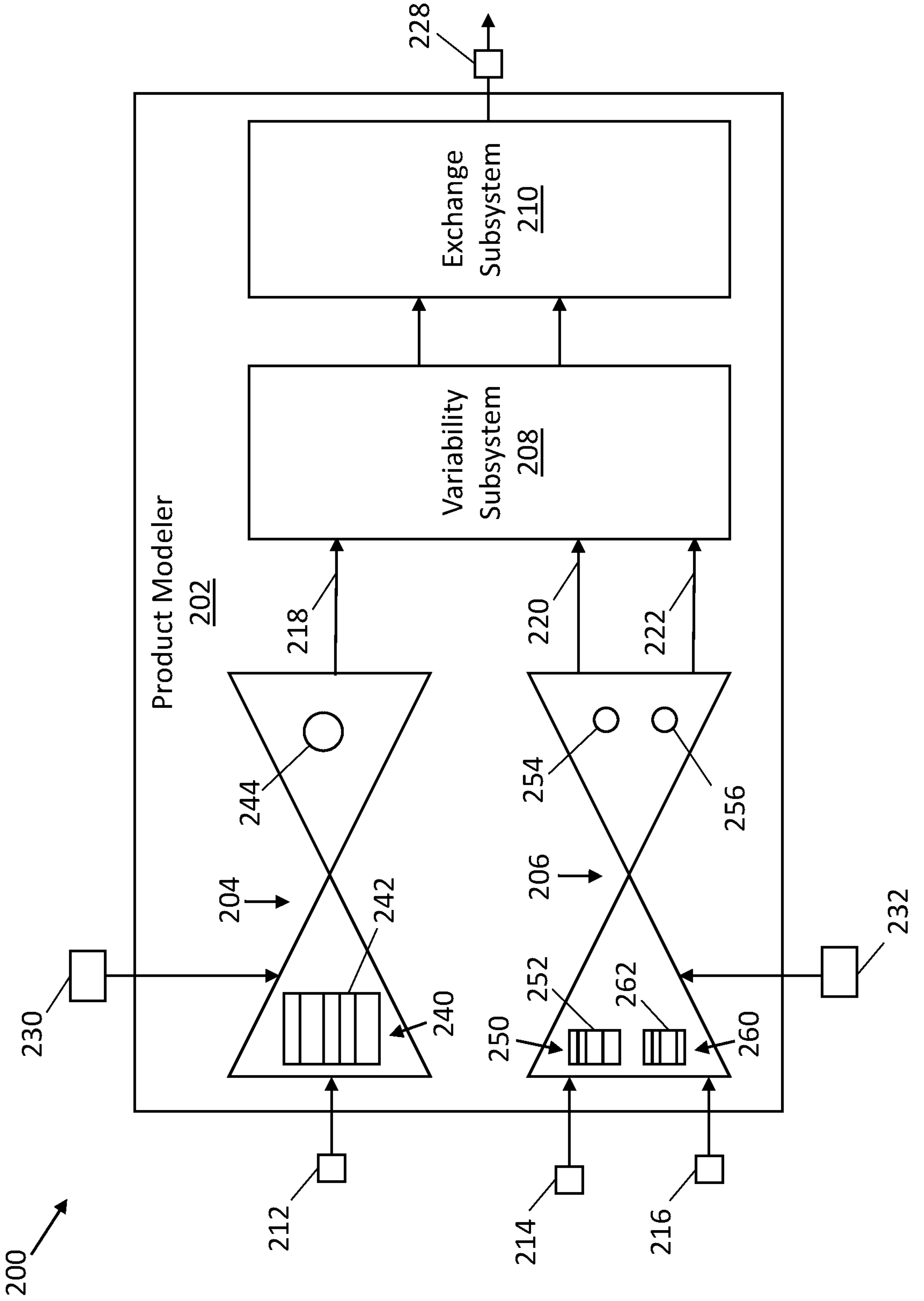
FIG. 2 illustrates a block diagram of a product modeler, according to an embodiment.

Upon transmission of the dynamic order dataset, the execution system 104 receives the dynamic order dataset through the network 116. The information included in the dynamic order dataset is then bifurcated into protected data and unprotected data. In some embodiments, a data anonymity subsystem 130 of FIG. 2 is responsible for the bifurcation of the data in the dynamic order dataset. The data anonymity subsystem 130 receives the dynamic order dataset and determines, based in part on an anonymity protocol, which data are protected, and which data are unprotected. The anonymity protocol may include instructions for the execution system to receive and/or read metadata tags of the dynamic order dataset to determine which data is protected and which data is unprotected. For example, in originating a dynamic order, certain input fields may include tagged metadata that may tag data inputted into certain input fields as protected or unprotected, based on the type of data or a predetermined framework. In one embodiment, the anonymity protocol receives an indication that the protected data is protected based on the tagged metadata and bifurcates the dynamic order dataset into two distinct datasets, stored in distinct electronic storage locations within the execution system or elsewhere. In some embodiments, the execution engine bifurcates the protected data by masking the protected data. In some embodiments, the protected data may only be accessed or revealed through the use of an authentication system (e.g., tokens, passwords, etc.). In other embodiments, the anonymity protocol determines which data is protected or unprotected based on a user-input tag of the data as protected or unprotected. For example, the originator system 102 and/or the respondent system 106 may in some embodiments, tag data (e.g., an entity name) as protected based on a received indication of such by a user's input. In such embodiments, the execution system 104 may receive the indication of the protected data tag from the originator system 102 and/or the respondent system 106 and bifurcate the tagged data from the other data (e.g., removing it from the dataset or applying a new tag). While described herein as resident on, and executed by, the execution system 104, the data anonymity subsystem 130 may be resident on any of the servers described herein, including, but not limited to, the originator system 102, the execution system 104, the respondent system 106, and/or the exchange system 108.

Protected data may be any data within the dynamic order dataset. In an embodiment in which the dynamic order is associated with the first underlyer class, the protected data may be an identity of the entity associated with the origination of the dynamic order, an implied volatility/option amount, and/or the request type (e.g., to buy or sell). In an embodiment in which the order is associated with the second underlyer class, the protected data may include an identity of the entity associated with the origination of the dynamic order, the reserve execution threshold, and/or the request type. The unprotected data may be any data. In some embodiments, the unprotected data is all remaining data in the dynamic order dataset that is not protected. In embodiments in which the dynamic order is associated with the first underlyer class, the unprotected data may include the underlyer identifier, the underlyer class, the number of contracts, the expiry date, the put/call, the AON, the option model, and/or the request type. The various data associated with the plurality of order attributes included in the dynamic order dataset may have corresponding metadata tags and/or labels for distinguishing a type of order attribute and used to determine whether the order attribute is protected data or not.

In embodiments in which the underlyer associated with the dynamic order is in the second underlyer class, the unprotected data may include an issuer of the underlyer, a coupon, a maturity date, a number of underlyers of the order, and the standard underlyer. In some embodiments, the standard underlyer may be a benchmark instrument and may be, but is not limited to, an equity security, U.S. Treasury securities, corporate bonds, mortgage securities, U.S. Agency securities, currencies, futures contracts, commodities, a U.S. Treasury bond, a standard index, or any other underlyer commonly accepted as an underlyer used to relationally compare underlyers. Various underlyers may be valued relationally to differing standard underlyers. For example, a corporate bond may be relationally linked to a U.S. Treasury security, an Off-the-Run U.S. Treasury security may be relationally linked to other designated U.S. Treasury securities, a municipal bond may be relationally linked to a U.S. Treasury security, other municipal bonds may be relationally linked to designated and published market indices. In other embodiments, the standard underlyer is the equity associated with the order.

Upon determining which data is protected data and which data is unprotected data, the data anonymity subsystem 130 generates a protected dataset (comprising the protected data) and an unprotected dataset (comprising the unprotected data). In some embodiments, the data anonymity subsystem 130 is hosted by the originator system 102. However, it is understood that the data anonymity subsystem 130 may be hosted on the execution system 104 and/or the respondent system 106. If the protected dataset and the unprotected dataset are generated by the originator system 102, the protected dataset and the unprotected dataset may be aggregated into a single dataset (e.g., a dynamic order dataset) for transmission to the execution system 104 or the respondent system 106.

If the protected dataset and the unprotected dataset are generated by the execution system 104, the protected dataset and the unprotected dataset may be aggregated into a single dataset (e.g., a dynamic order dataset) for transmission to the respondent system 106. However, the protected dataset may be encrypted or otherwise protected so as to not be accessible by the respondent system 106. In other embodiments, only the unprotected data is transmitted from the execution system 104 to the respondent system 106. In an exemplary embodiment, the execution system 104 receives the dynamic order dataset, and the data anonymity subsystem 130 (resident on the execution system 104) bifurcates the data within the dynamic order dataset into the protected dataset and the unprotected dataset. Upon bifurcating the two datasets, the execution system 104 generates a proposal request dataset comprising the unprotected dataset and data from the data feed. The proposal request dataset is made available, on the execution system 104, to one or more respondent system 106, or transmitted to one or more respondent system 106.

In some embodiments, the execution system 104 receives additional data feeds beyond the dynamic order dataset. For example, the execution system 104 may receive/retrieve a data feed associated with the standard underlyer. In such embodiments, the data feed may include various attributes (e.g., a current standard underlyer value, a historical standard underlyer value, volatility, historical trends, yield to maturity rate, etc.) of the standard underlyer indicated in the dynamic order request. In an exemplary embodiment, a current amount (e.g., a yield to maturity of the standard underlyer) of the standard underlyer is included in the data feed and periodically updated such that the current standard underlyer amount is received periodically.

Upon receiving the dynamic order request and the data feed, the execution system 104 generates a proposal request dataset. The proposal request dataset may include, among other data, the unprotected dataset, and data from the data feed (e.g., a current standard underlyer value). In various embodiments, the proposal request dataset includes the data from the unprotected dataset and the received data feed but additionally includes input objects to receive one or more inputs from the respondent system 106 and/or the execution system 104. It is contemplated that the proposal request dataset includes the information necessary for the respondent system 106 to fully respond to the dynamic order from the originator system 102 and thus executing the dynamic order. In various embodiments, the protected dataset is not accessible by the respondent system 106. In so doing, the execution system 104 obfuscates the protected data from the respondent system 106. This obfuscation may be performed by a variety of methods. For example, the execution system 104 may remove the protected dataset from the displayed proposal request dataset, adjust one or more HTML instructions or other display instructions, hide the protected data from display, mask the protected data from display, intercept the protected data or transmitted data packet during transmission, and/or extracting the protected data, among other methods.

In an exemplary embodiment, the respondent system 106 accesses the proposal request dataset, either by receipt from the execution system 104 and/or through accessing the proposal request dataset on the execution system 104. Upon accessing the proposal request dataset, the respondent system 106 provides various inputs into the input objects of the proposal request dataset. The proposal request dataset may be substantially similar (e.g., a mirror) but not identical to the request template originally accessed by the originator system 102. For example, in an embodiment in which the dynamic order is for an underlyer in the second underlyer class, the proposal request dataset may include an indication (as inputted by the originator system 102) of the underlyer associated with the dynamic order, an expiry, and the standard underlyer. In addition, the proposal request dataset may include an input object into which the respondent system 106 may input a value or indication for a first execution value associated with a liquidity provider (e.g., a bid to execute the dynamic order) and a second execution value associated with a liquidity requester (e.g., an offer to execute the dynamic order). This two-sided proposal allows the originator of the order to originate an order without providing information to any third parties that may be preemptively acted upon (e.g., whether the originator intends to buy or sell). As such, any respondents may be required to respond with a proposal response on both sides of the order.

In various embodiments, the reserve execution threshold (as defined by the originator system 102), the first execution value, and the second execution value are provided by the respective systems (e.g., the originator system 102 and the respondent system 106) in a unitary measurement. For example, in an embodiment in which the order is for an underlyer in the second underlyer class, the unitary measurement may be basis points above or below the current standard underlyer value (as received by the data feed source). While the reserve execution threshold, first execution value, and the second execution value may be inputted in the same unitary measurement (e.g., basis points), the time at which the inputs are determined may be different. By way of example, the originator system 102 may originate the dynamic order at 12:00 pm with the reserve execution threshold at 1.02555 basis points above the yield to maturity of the standard underlyer at 12:00 pm (e.g., the time of origination). Two minutes later, at 12:02 pm, the respondent system 106 generates the proposal response dataset with the first execution value (e.g., a bid) at 1.02 basis points above the yield to maturity of the standard underlyer (e.g., the benchmark instrument) at 12:02 pm (e.g., the time of response) and the second execution value (e.g., an offer) at 0.99 basis points above the yield to maturity of the standard underlyer (e.g., the benchmark instrument) at 12:02 pm (at the time of response). At the close of the order period (e.g., at the expiry, the time of closing, etc.), the execution system 104 converts the reserve execution threshold, the first execution value, and the second execution value from basis points above and/or below the yield to maturity of the standard underlyer at the time of closing (e.g., the closing yield to maturity) to monetary amounts by applying the basis points to the closing yield to maturity. Thus, the proposal request and proposal response are anchored not at the time of origination or time of response, respectively, but at the time of closing (e.g., the time of expiry). The time between the time of origination and the time of expiry (e.g., the time of closing) may be referred to as a solicitation period. Thus, the time of expiry is the conclusion of the solicitation period.

The inputs responding to the proposal request dataset are aggregated into a proposal response dataset. In various embodiments, the respondent system 106 is required to answer all available inputs in the proposal request data prior to generating and transmitting the proposal response dataset. In embodiments, in which the proposal request dataset is transmitted to the respondent system 106, the respondent system 106 generates the proposal response dataset with the received inputs and transmits the proposal response dataset to the execution system 104. In embodiments in which the respondent system 106 accesses the proposal request dataset at the execution system 104, either the execution system 104 or the respondent system 106 may generate the proposal response dataset from the inputted values.

As with the dynamic order dataset, the proposal response dataset is bifurcated, by the data anonymity subsystem 130 into a protected dataset and an unprotected dataset. The protected dataset may include the first execution value and the second execution value and/or the identification of an entity responding to the proposal request dataset. The protected dataset of the response system respondent system 106 is protected from viewing by the originator system 102 and all other respondent systems 106 in the data protection architecture 100. Thus, maintaining the privacy and anonymity of the parties involved in the dynamic order. The execution system 104 may receive one or more proposal response datasets from one or more respondent systems 106. Each protected dataset of each proposal response dataset is obfuscated from each system's (e.g., each originator system 102 and respondent system 106) access. In some embodiments, the entirety of the proposal response dataset is protected from access by all other respondent systems 106.

As described herein, at the end of the solicitation period (e.g., the time of closing), all reserve execution thresholds are converted into an adjusted reserved execution threshold based on the yield to maturity of the underlyer at the closing time, all first execution values are converted into adjusted first execution values, and all second execution values are converted to adjusted second execution values. It should be understood that in an exemplary embodiment, the originator system 102 generates the reserve execution threshold (e.g., a reserve price) based on an originator's input. According to at least one embodiment, the reserve execution threshold is a single value/price. In the case in which the originator is seeking a bid, the reserve execution threshold is the price below which the originator will not sell the order instrument. In the case in which the originator is seeking an offer, the reserved execution threshold is the price above which the originator will not buy the order instrument. In an exemplary embodiment, the dynamic relational adjustment subsystem of FIG. 2 (resident on the execution system 104) generates the adjusted reserve execution thresholds, the adjusted first execution values, and/or the second execution values by converting their respective inputs from the originator system 102 and the execution system 104. In an embodiment, the execution system 104 presents for display to the respondent system 106, prior to submission of the proposal response dataset, a notice of the adjustment being made to the first and second execution value and notifying the respondent system 106 that by continuing the submission, that the adjustment is permitted.

Upon generating the adjusted reserve execution threshold, the adjusted first execution value, and/or the second execution values, the execution system 104 determines if any of the adjusted first execution values, and/or the second execution values satisfy the adjusted reserve execution threshold. The execution system 104 determines which values (e.g., the adjusted first execution values or the adjusted second execution values) to compare against the adjusted reserve execution threshold based on the request type (e.g., seeking a bid or offer) in the dynamic order dataset. When the indicated request type corresponds to a liquidity requester, the execution system 104 compares the adjusted reserve execution threshold to the adjusted first execution values. When the indicated request type corresponds to a liquidity provider, the execution system 104 compares the adjusted reserve execution threshold to the adjusted second execution values.

In response to at least one of the received, adjusted execution values (correctly corresponding to the request type of the dynamic order) satisfying the adjusted reserve execution threshold, the execution system 104 selects the satisfying adjusted first execution value or the satisfying adjusted second execution value furthest from the adjusted reserve execution threshold (the satisfying adjusted execution value corresponding to the inputted request type of the dynamic order). This selection is the adjusted execution value that most satisfies the adjusted reserve execution threshold (i.e., gives the originator the best proposal). Upon selecting the adjusted execution value, the execution system 104 performs an execution action. The execution action may include initiating an execution of the order or transmitting an alert to one or both of the originator system 102 and/or the respondent system 106. Initiating the execution of the order may include transmitting an initiation request, including the order details, to a clearing agency (e.g., the exchange system 108) to execute the order. The execution system 104 may transmit data including the underlyer ID, the number of underlyers, the originator, the respondent, the selected, adjusted execution value, the identification of each party as a liquidity provider and/or a liquidity requester, etc., in the initiation request. The initiation request may also include any additional information necessary to execute the order between the originator system 102 and the respondent system 106. The exchange system 108 receives the initiation request and proceeds to execute the order. While in an exemplary embodiment, the initiation request includes the adjusted execution value, it should be understood that the execution system 104 may transmit the original first execution value or second execution value to the exchange system 108 in the initiation request. In some embodiments, the exchange system 108 will only receive adjusted execution values and not the original execution value.

In embodiments in which no adjusted evaluation value satisfies the adjusted reserve execution threshold, the execution system 104 identifies a corresponding adjusted execution value (e.g., an adjusted execution value corresponding to the request type of the dynamic order) closest to the adjusted reserve execution threshold. The execution system 104 then determines a mediated execution value, referred to herein as the midpoint (e.g., a midpoint amount between the identified adjusted execution value and the adjusted reserve execution threshold). In an embodiment, the adjusted execution value corresponding to the hidden request type that is arithmetically closest to the adjusted reserve execution threshold is identified as the value/price to use in determining the mediated execution value. While a midpoint between the adjusted reserve execution threshold and the adjusted execution value is described herein, it is understood that the mediated execution value may be any value. Alternative examples of the mediated execution value include the adjusted execution value, a weighted midpoint based on the yield to current value or other constant, the adjusted reserve execution threshold, etc. The execution system 104 transmits this determined midpoint to both the originator system 102 and the execution system 104 as a proposal to execute the order. The originator system 102 and the execution system 104 may each independently receive a user input indicating acceptance or denial of the midpoint and subsequently transmit a corresponding indication of acceptance or denial to the execution system 104. Upon receipt of acceptance by both the originator system 102 and the respondent system 106, the execution system 104 performs the execution action, as described herein. Upon receiving a rejection of the midpoint either by the originator system 102, the execution system 104, or both, the execution system 104 closes the dynamic order and the dynamic order is unfulfilled.

In addition to dynamic relational order management, the systems and methods presented herein relate to various modeling techniques of products (e.g., bond portfolios) for improved identification and selection of corresponding products (e.g., bond ETFs). In an exemplary embodiment, the products described herein may refer to portfolios comprising one or more underlyers (described as subproducts), such as bonds or stocks. The corresponding products described herein may refer to exchange-traded funds (ETFs) comprising one or more underlyers (described as corresponding subproducts), such as bonds or stocks. The execution system 104 may have resident a product modeler 132. The product modeler 132 may include machine-readable, non-transitory media that, when read by one or more processors, cause the execution system 104 to perform one or more processes and/or methods (e.g., a computer-implemented method).

In one embodiment, the product modeler 132 may provide for the display of a graphical user interface (e.g., on the originator system 102) with various content items and selectable objects to receive a user input related to the product to be modeled by the product modeler 132. The GUI may include various input fields with corresponding product attributes to receive values and data associated with the product to be modeled. For example, the GUI may include an input field to input a product name (or nickname), and one or more CUSIP identifiers with corresponding par values (in some embodiments, the par values are in $1000 increments). The originator system 102 receives (e.g., from the client device 110 accessing the originator system 102) one or more inputs at the input fields. The inputs may be tied to the corresponding product attribute in one or more data packets or data files. For example, the inputted data may be used to generate a product dataset associated with the product to be modeled. The product dataset may include indications of one or more subproducts making up the product and the corresponding par value of each of the subproducts.

The product dataset may be generated at the originator system 102 or generated by the product modeler 132 at the execution system 104 if the originator system 102 is accessing the product modeler 132 on the execution system 104. The product data inputted into the GUI to generate the product dataset may be inputted manually one input field at a time and/or uploaded as a file with the appropriate product data. For example, a client device may upload a CSV file with the product information into the GUI. Additional or alternative data files that may be used to upload the product information may include but are not limited to, Excel spreadsheets, JSON files, XML files, SQL database files, text, image files, audio files, video files, and/or log files. In various embodiments, the inputted values are linked or otherwise referenced to a product/subproduct attribute. In such a manner, upon receipt of the product dataset by the execution system 104 (in some embodiments, at the product modeler 132), the product modeler 132 deconcatenates the individual data points in the product dataset for modeling.

In some embodiments, the product dataset includes historical values (e.g., amounts) of the product and/or the subproducts. In an exemplary embodiment, the historical data tracks back 35 days from the date of transmission of the product dataset. The originator system 102 may include various APIs, web scrapers, RSS feeds, data aggregator services, extensions, etc., for receiving data feeds for auto-populating historical data. For example, the originator system 102 may receive an indication of a product with corresponding subproducts and, when generating the product dataset, automatically execute the resident API, web scraper, RSS feed, etc., to retrieve historical data (e.g., looking back a statistically significant amount of time, such as 35 days) of the product and/or subproducts. This historical data is concatenated to the product dataset for transmission to the execution system 104. Alternatively, in some embodiments, the product dataset generated and transmitted by the originator system 102 does not include historical data. In such embodiments, the execution system 104 may be configured (through the same means described for the originator system 102) to retrieve historical data of the product and/or various subproducts. The execution system 104 may access the product dataset, extract the various subproduct identifiers, and send a request to retrieve the historical data of the product or subproducts over a statistically significant period of time. In some embodiments, the historical data requested is hosted in a data storage location (e.g., the database 114) or in various remote or local servers. The execution system 104 receives the requested data and generates a product history dataset with the retrieved data or, additionally or alternatively, concatenates the historical data to the previously received product dataset.

The originator system 102, in transmitting the product dataset to the execution system 104, also sends a modeling request. The modeling request, when received by the execution system 104, causes the product modeler 132 to execute a product model. The modeling request may include additional information/data related to the modeling request. For example, the modeling request may include, among other data, a number of corresponding products to include in the product model, an identifier of the one or more corresponding products to include in the product model, a look-back period (e.g., an amount of time to look back), a statistical significance amount that the product modeler 132 may use to determine how far back to look in historical data, an auto-execute option to automatically execute an exchange based on a corresponding product reaching a specified threshold with respect to the product, a variability regression method, an execution threshold corresponding to the auto-execution option above, etc.

The execution system 104 also retrieves corresponding product datasets (e.g., a first corresponding product dataset and a second corresponding product dataset). The execution system 104 may retrieve these corresponding product datasets at regular intervals, storing the collected data in a database (e.g., the database 114). Additionally or alternatively, the execution system 104 may transmit one or more retrieval requests (as described above) for the corresponding product datasets upon receipt of the product dataset and modeling request. In some embodiments, the retrieval request may be tailored to the modeling request received by the originator system 102. For example, the modeling request may include specific corresponding products to use in the product modeling, a look-back period, etc. This received data may be included in the retrieval request to specifically identify the historical data source and the specific data to transmit to the execution system 104. In some embodiments, the execution system 104 requests the corresponding product datasets to be transmitted in a specified format, order, sequence, or file type. In some embodiments, the execution system 104 is configured to retrieve any format of data and dynamically adjust the retrieved corresponding product dataset to satisfy a required or preferred file format.

Turning now to FIG. 2, a system 200 is shown for modeling a product 240 for corresponding product identification and selection. The system 200 may include, in some embodiments, a product modeler 202. The product modeler 202 may in some embodiments, be substantially the same as the product modeler 132 of FIG. 1. Returning to FIG. 2, the product modeler 202 may be resident on an execution system (e.g., execution system 104 of FIG. 1. However, it should be understood that the product modeler 202 may also be resident on an originator system (e.g., the originator system 102 of FIG. 1) or a respondent system (e.g., the respondent system 106 of FIG. 1). In any case, the functionality of the product modeler 202 is the same, independent of the system upon which it is hosted.

The product modeler 202 may include a product modifier 204, a corresponding product modifier 206, a variability subsystem 208, and/or an exchange subsystem 210. The product modifier 204 may receive current and/or historical product data (e.g., product makeup, subproduct values, product values) from a data feed 230. Likewise, the corresponding product modifier 206 may receive current and/or historical corresponding product data (e.g., corresponding product makeup, corresponding subproduct values, corresponding product values) from a data feed 232.

A product dataset 212 is received by the product modifier 204, such as from an originator system. As described herein, the product dataset may include data corresponding to the product 240 to be modeled, as indicated by a modeling request by the originator system. The product dataset 212 may include data associated with the product 240 comprising various subproducts 242. The data within the product dataset 212 related to the subproducts 242 may include various attributes of the subproducts 242, including, by not limited to, an issuer of the subproducts 242, a maturity date of the subproducts 242, and a coupon rate of the subproducts 242. The product modifier 204 applies one or more modifications to the product 240 to transform the product 240 into a product model output 244. The product 240, after being converted into the product model output 244, is able to be more efficiently and accurately compared to a corresponding product 250 and a corresponding product 260. In addition to data associated with the product 240, the originator system may also transmit modeling details corresponding to the model. For example, the originator system may include a hedge ratio (e.g., 100%, 50%, 25%, or any percentage) of the product's principal value to alter the model. In addition, the originator system may include in the execution details an "in the money," "at the money," or "out of the money" strike price, and an expiry date. Upon selecting the above modeling details (e.g., through the use of a client device accessing the originator system), the originator system transmits the modeling details and the product dataset 212 to the product modeler 202. The product modeler 202 is then configured to run the model based on the modeling details, as described below.

The product modifier 204 applies various transformations to the product 240 to generate the product model output 244 (e.g., single, value-weighted indicators such as a single, value-weighted price). In one example, the product dataset 212 includes at least a CUSIP of each subproduct 242 and a par value (in $1000 increments) for each subproduct 242 of the product 240. The product modifier 204 converts the par value into a value of holding per subproduct 242 by multiplying the par value of each subproduct 242 by a closing price of the subproduct 242 at the time of modeling. The closing price of each subproduct 242 may be a present value, a yield to maturity, a yield to call, a current yield, discounted cash flow, a credit spread, an option-adjusted spread, a comparable, etc. The closing price of the subproduct 242 may come from the data feed 230 and may be requested (and received) during each iteration of the model. The product modifier 204 sums the value per subproduct 242 of each of the subproducts 242 to generate a total product value ("TPV"). Upon generating the TPV, the product modifier 204 further transforms the product 240 by generating a percent of value of holding per subproduct 242 ("% VPH") for the total product. In some embodiments, this is executed by dividing each price per subproduct 242 by the TPV. At this point, the product modifier 204 has generated a % VPH for each of the constituent subproducts 242. The % VPH of each of the subproducts 242 is then multiplied by the closing price for the corresponding subproduct 242 to derive a value-weighted price ("VWP") for the individual subproduct 242. This process is repeated for each of the constituent subproducts 242. The VWP of each of the constituent subproducts 242 is summed for a single, value-weighted price ("SVWP") of the product 240. This process is iterated each day across the look-back period specified by the product modeler 202 or the modeling request from the originator system. The SVWP of the product 240 over the look-back period may be stored in a dataset and/or graphically illustrated on a GUI as a visual indicator, such as shown in FIG. 3.

Figure 3:
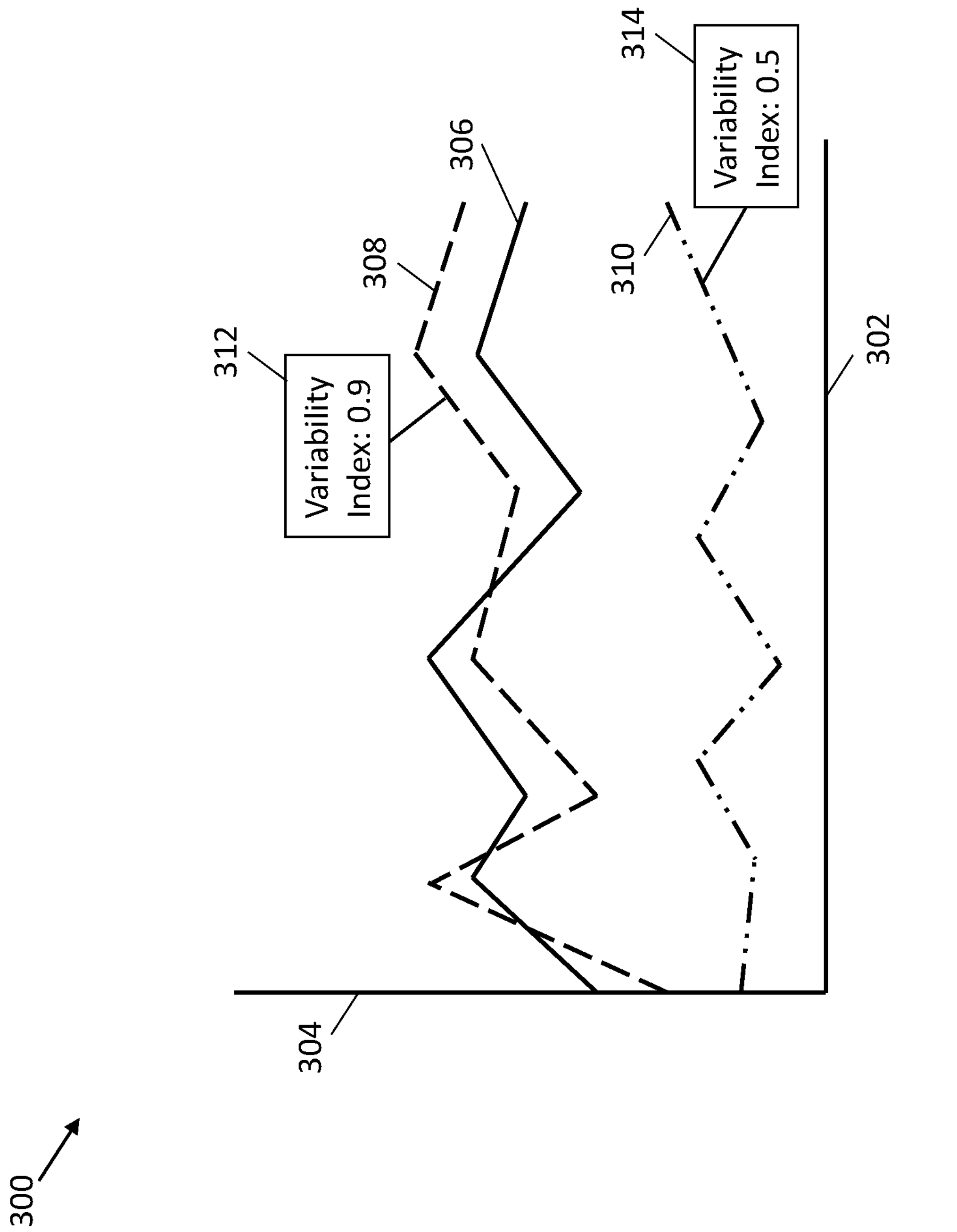
FIG. 3 depicts a graphical representation of a product's value over time in relation to two corresponding products, according to an embodiment.

Turning briefly to FIG. 3, a graphical illustration 300 of a product's SVWP 306 over a look-back period is shown. The graphical illustration 300 depicts a visual indicator (e.g., a graph) with an x-axis 302 corresponding to time and a y-axis 304 corresponding to a value of the product and corresponding products. The SVWP 306 is shown graphed on the graphical illustration with relation to a first corresponding product 308 and a second corresponding product 310.

Returning to FIG. 2, the product modeler 202 may further employ the corresponding product modifier 206 in executing the product model. The corresponding product modifier 206 receives corresponding product datasets 214 and 216 comprising data associated with one or more corresponding products 250 and 260, respectively. The first corresponding product 250, comprises one or more first corresponding subproducts 252. The second corresponding product 260 comprises one or more corresponding subproducts 262. The corresponding product datasets 214 may include data associated with the corresponding product 250 and/or the various one or more first corresponding subproducts 252. The data may include an identifier (e.g., CUSIP) of the corresponding product 250, identifiers of the individual one or more first corresponding subproducts 252, current and/or historical values of the corresponding product 250 and/or one or more first corresponding subproducts 252, etc. In some embodiments, the corresponding product datasets 214 and the corresponding product datasets 216 are transmitted by and received from the originator system (or respondent system). In other embodiments, the corresponding product datasets 214 and/or the corresponding product datasets 216 are retrieved by an alternative data source (e.g., the data feed 232).

As with the product 240, the corresponding product 250 and the corresponding product 260 may be transformed or otherwise adjusted to generate a first corresponding product model output 254 and/or a second corresponding product model output 256, respectively. The transformations and/or adjustments to the corresponding product 250 and the corresponding product 260 (or the corresponding product datasets 214 and/or the corresponding product datasets 216) may correspond to reformatting the datasets into a format compatible with the variability subsystem 208 (e.g., to match the product 240). Additionally or alternatively, the transformations and/or adjustments may be employed to increase efficiency of the variability subsystem 208, such as by deleting data within the corresponding product datasets 214 and/or the corresponding product datasets 216 not necessary for executing the variability subsystem 208. In some embodiments, as shown in FIG. 2, the corresponding product modifier 206 may apply various transformations or adjustments to the corresponding product datasets 214 and/or the corresponding product datasets 216 to generate the first corresponding product model output 254 and/or second corresponding product model output 256, respectively. The transformation may be substantially similar to that of the product 240 to the product model output 244.

In some embodiments, the corresponding product datasets 214 and/or the corresponding product datasets 216 include the first corresponding product model output 254 and/or the second corresponding product model output 256. In such embodiments, the corresponding product modifier 206 does not need to adjust the corresponding product 250 and/or the corresponding product 260.

Upon determining or receiving the product model output 244, the first corresponding product model output 254, and/or the second corresponding product model output 256, the product modeler 202 inputs the product model output 244 into the variability subsystem 208 at input 218, the first corresponding product model output 254 into the variability subsystem 208 at input 220 and inputs the second corresponding product model output 256 into the variability subsystem 208 at input 222.

The variability subsystem 208 is configured to execute one or more computer-implemented methods for generating at least one variability index. In some embodiments, the variability subsystem 208 generates various variability indices. By way of example, the variability subsystem 208 may generate a first variability index corresponding to the corresponding product 250 and a second variability index corresponding to the corresponding product 260. The variability index may include any indicator of variability between two datasets (e.g., the product dataset 212 and the corresponding product dataset 214, or the product dataset 212 and the corresponding product dataset 216). Various variability indices may include, but are not limited to, Standard Deviation, Variance, Range, Interquartile Range ("IQR"), Mean Absolute Deviation ("MAD"), Coefficient of Variation ("CV"), Relative Standard Deviation ("RSD"), Percentile Range, Root Mean Square Error ("RMSE"), Mean Squared Error ("MSE"), Pearson Correlation Coefficient, Spearman Rank Correlation Coefficient, Kendall's Tau, Coefficient of Determination $R^2$), Adjusted $R^2$, Concordance Correlation Coefficient ("CCC"), Lin's Concordance Correlation Coefficient ($\rho_c$), and/or Intraclass Correlation Coefficient ("ICC").

In an exemplary embodiment, the variability subsystem 208 compares the product model output 244 to both the first corresponding product model output 254 and the second corresponding product model output 256 to determine a first variability index (corresponding to the first corresponding product model output 254 with relation to the product model output 244) and a second variability index (corresponding to the second corresponding product model output 256 with relation to the product model output 244). In an exemplary embodiment, the variability index is a coefficient of determination ($R^2$). To ensure statistically significant results, the product model output 244, the first corresponding product model output 254, and the second corresponding product model output 256 each comprise at least 35 days of historical data of the respective product or corresponding product.

To generate the first variability index and/or the second variability index corresponding to the first corresponding product 250 and/or the corresponding product 260, the variability subsystem 208 performs a linear regression to fit a line to the data. The variability subsystem 208 calculates the total sum of squares, the regression sum of squares, the residual sum of squares, and then executes the coefficient of determination formula to calculate $R^2$.

Upon determining, by the variability subsystem 208, the first variability index and the second variability index, the product modeler 202 may display the first variability index and/or the second variability index on the GUI as a visual indicator, as shown in FIG. 3. Returning to FIG. 3, a variability index 312 corresponding to the first corresponding product 308 is displayed as a first visual indicator and the variability index 314 corresponding to the second corresponding product 310 is displayed as a second visual indicator. While FIG. 3 illustrates one embodiment of the GUI with associated visual indicators, it should be understood that various alternative formats of data presentation may be used to display the variability index of the various corresponding products. By way of example, the corresponding products may be listed by name in a table view from highest variability index to lowest variability index. In some embodiments, the variability index may be displayed with the name of the corresponding product. In some embodiments, only corresponding products above a specified or predetermined variability threshold are displayed for view.

In some embodiments, the modeling request (or the product dataset 212) submitted by the originator system may include a variability threshold. The variability threshold may be an indication of a variability index threshold that may cause the product modeler 202 to perform an action upon the first variability index or the second variability index satisfying. In an embodiment, the exchange subsystem 210 may be configured to initiate an exchange of the corresponding product 250 in response to the first variability index satisfying the received variability threshold or initiate an exchange of the corresponding product 260 in response to the second variability index satisfying the variability threshold.

By way of example, the exchange subsystem 210 may receive an indication of the variability threshold (e.g., 0.89) from the originator system, the first variability index (e.g., 0.9), and the second variability index (e.g., 0.5). The variability subsystem 208 compares the first variability index and the second variability index to the variability threshold to determine if the variability threshold is satisfied. In this embodiment, the variability threshold is satisfied if the first or the second variability index is higher than the variability threshold. In this example, the first variability index is above the variability threshold, thus satisfying the variability threshold. The second variability index is below the variability threshold, thus not satisfying the variability threshold. In some embodiments, the corresponding product with the variability index that satisfies the variability threshold and has the least variation from the product is chosen as the satisfying variability index. For example, if both corresponding products satisfy the variability threshold, the corresponding product with less variability with respect to the product is selected as the satisfying corresponding product. In this example, the exchange subsystem 210 may initiate execution of an exchange of the first corresponding product 250 corresponding to the first variability index. Initiation of execution may include transmitting an instruction 228 to an exchange system (e.g., the exchange system 108 of FIG. 1) to execute a trade of the first corresponding product 250. In at least one embodiment, the trade includes shorting the first corresponding product, thus minimizing the effects of changes to the value of product 240. In another embodiment, the trade includes buying the first corresponding product 250.

In some embodiments, the corresponding product modifier 206 may make various adjustments to the one or more first corresponding subproducts 252 of the corresponding product 250 to create an adjusted first corresponding product that has a higher adjusted first variability index. This may be done, for example, when none of the corresponding products 250, 260 result in a variability index that satisfies the variability threshold. For example, the corresponding product modifier 206 may replace individual corresponding subproducts 252 of the corresponding product 250 with one or more new corresponding subproducts 252 not originally in the corresponding product 250. Upon generating the adjusted first corresponding product (e.g., the first corresponding product model output 254), the variability subsystem 208 applies the variability analysis on the adjusted first corresponding product to generate an adjusted first variability index. In some embodiments, upon the adjusted first variability index of the adjusted first corresponding product satisfying the variability threshold, the exchange subsystem 210 receives an indication of the satisfying variability index. Upon receipt of the indication of the satisfying variability index, the exchange subsystem 210 initiates execution of an action corresponding to the adjusted first corresponding product. This may include exchanging various subproducts of the adjusted first corresponding product. In other embodiments, in which the original first corresponding product is currently owned by an entity associated with the originator system, the execution action may include transmitting instructions to an exchange system (e.g., the exchange system 108 of FIG. 1) to replace individual one or more first corresponding subproducts 252 with the new corresponding subproducts such that the originator system results in acquiring or shorting the adjusted first corresponding product. Additionally or alternatively, the execution action may include removing and/or replacing one or more subproducts 242 of the product 240.

The corresponding product modifier 206 may be run iteratively to determine an adjusted first corresponding product that satisfies the variability threshold. Additionally or alternatively, the product modifier 204 may run iteratively, similar to the corresponding product modifier 206, adjusting one or more individual subproducts 242 of the product 240 to result in higher variability indexes of the one or more first corresponding subproducts 252 and/or the corresponding product 260. All results of the product modeler 202 may be presented for display to the originator system.

The product modeler 202 may be executed at regular time intervals without the express submission by the originator system. The regular time intervals may be indicated in the original modeling submission. The regular time intervals may be determined by a default interval (e.g., every two weeks, every day, every minute, etc.). In other embodiments, the regular time intervals may correspond to changes in the subproducts 242 of the product 240 and/or the corresponding subproducts 252, 262 of the corresponding products 250, 260. Additionally, the product modeler 202 may transmit reports to the originator system at the conclusion of each iteration of the process executed by the product modeler 202. The transmitted report may include, among other data, an indication of the variability index of the corresponding products and/or recommended adjustments to make to currently owned corresponding products (e.g., adjust one or more positions in a currently owned corresponding product of the corresponding subproducts). In some embodiments, the product modeler 202 provides an interactive element in the transmitted report to accept the recommended adjustments. Upon receiving an indication, by the exchange subsystem 210 from the originator system, of an acceptance of the recommended adjustment, the exchange subsystem 210 may automatically transmit instructions to an exchange system (e.g., the exchange system 108 of FIG. 1) to execute the recommended adjustment on behalf of the entity associated with the originator system.

Figure 4A:
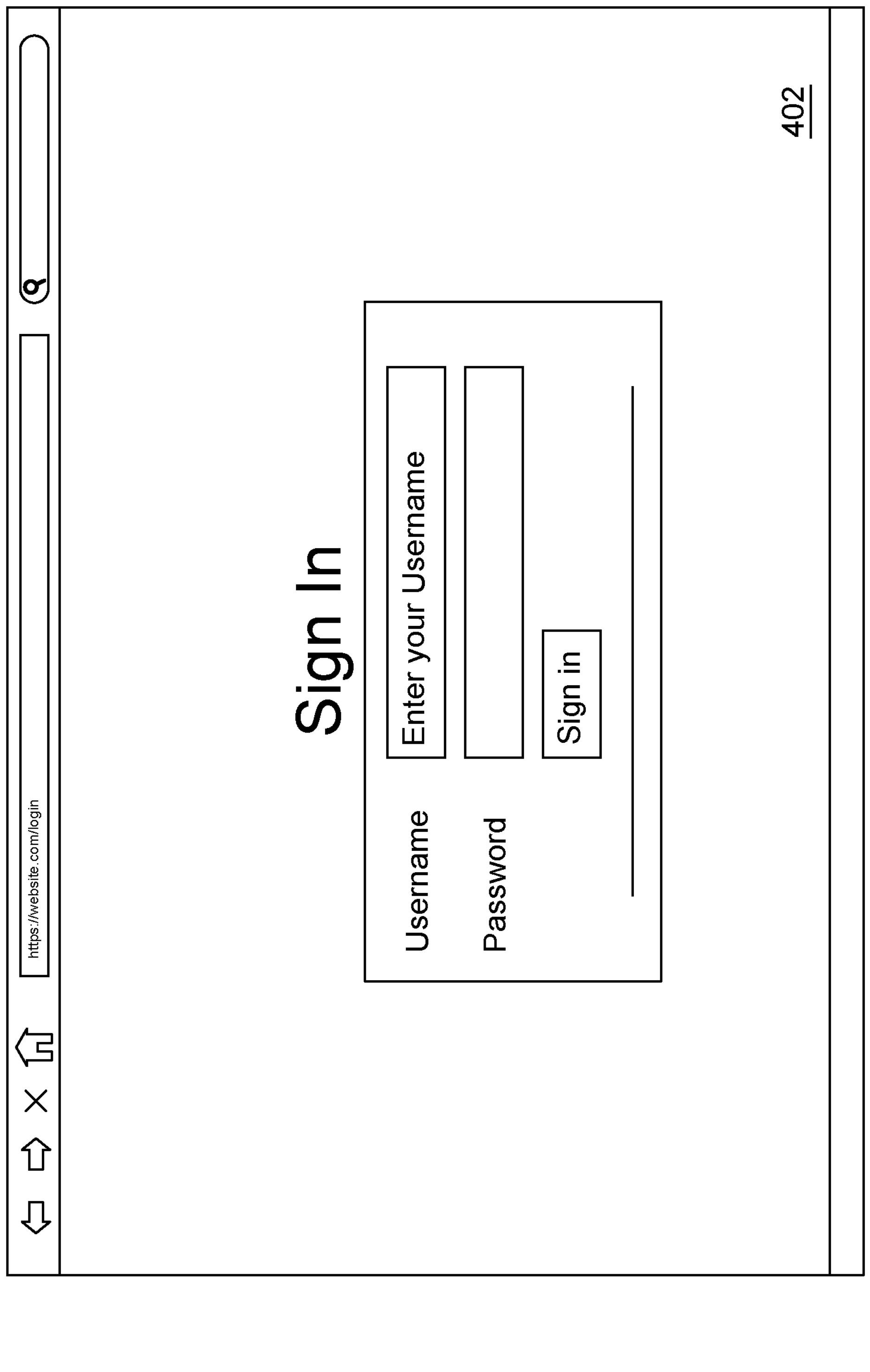
FIGS. 4A-4S depict a graphical user interface for interacting with various systems described herein, according to an embodiment.

Referring now to FIGS. 4A-4S, FIG. 4A illustrates a client device's display that has either navigated to an originator's system or accessed an originator's system application that provides, displays, or presents a dynamic order interface 400. As shown, the dynamic order interface 400 can include a plurality of interactive elements. Interactive elements (sometimes referred to herein as "input fields") can include, but are not limited to, text input, buttons, drop-downs, links, speech-to-text, and so on. Furthermore, various interactive elements are contemplated in this disclosure. For example, a user may select (e.g., via a touchscreen) the registration interactive element and input data through typing, speech input, selection, and so on. A webpage 402 of the dynamic order interface 400 can include various registration interactive elements that may be presented, such as, but not limited to, a username interactive element (e.g., text field) and a password interactive element (e.g., password text field). In some arrangements, each interactive element (inclusive of all interactive elements in FIGS. 4A-4S) can receive an input, via the client device (e.g., the client device 110 of FIG. 1), and be updated as the user inputs (or interacts) with the interactive element. In various arrangements, each webpage (e.g., 402-428) can be an individual interface such as a first application user interface, a second application interface, a third application interface, and so on.

In the example illustration 4B, the menu webpage 404 of the originator system is shown. An initial menu of various firms/accounts may be presented on the originator system, such as in the case of an account manager accessing the menu webpage 404. Through an interaction with the interactive element 440, an additional firm/account may be added to the account manager's list of accounts, such as shown in FIG. 4C.

Figure 4B:
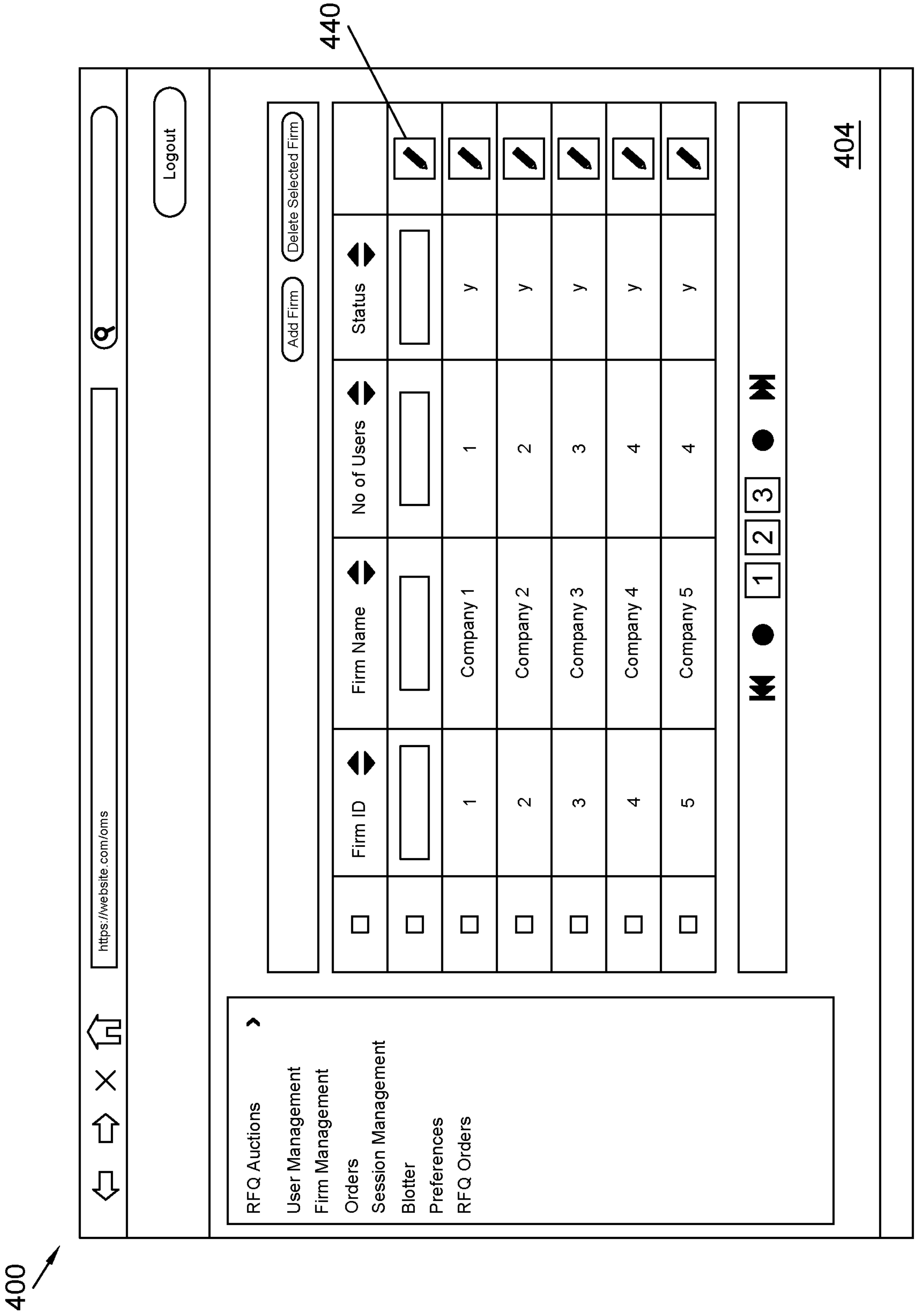
Figure 4C:
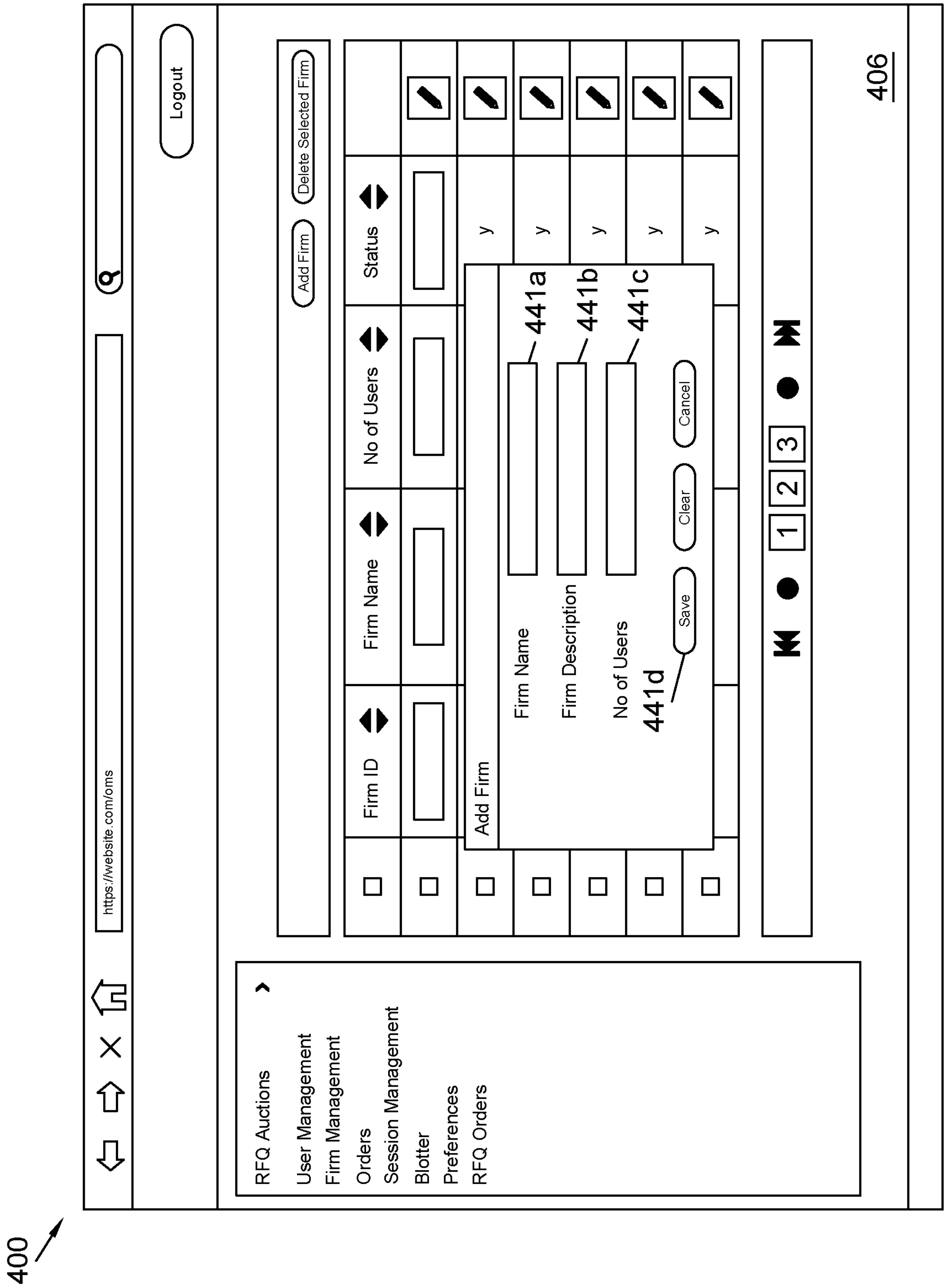

In example FIG. 4C, a webpage 406 of the originator system is shown for adding an additional firm/account. A user may input various data (e.g., Firm Name, Firm Description, Number of Users) through the use of interactive elements 441*a*, 441*b*, 441*c*, respectively. The input data may be stored, by the originator system, in one or more digital electronic storage locations (such as database 114 of FIG. 1) upon selection of the interactive element 441*d*.

Figure 4D:
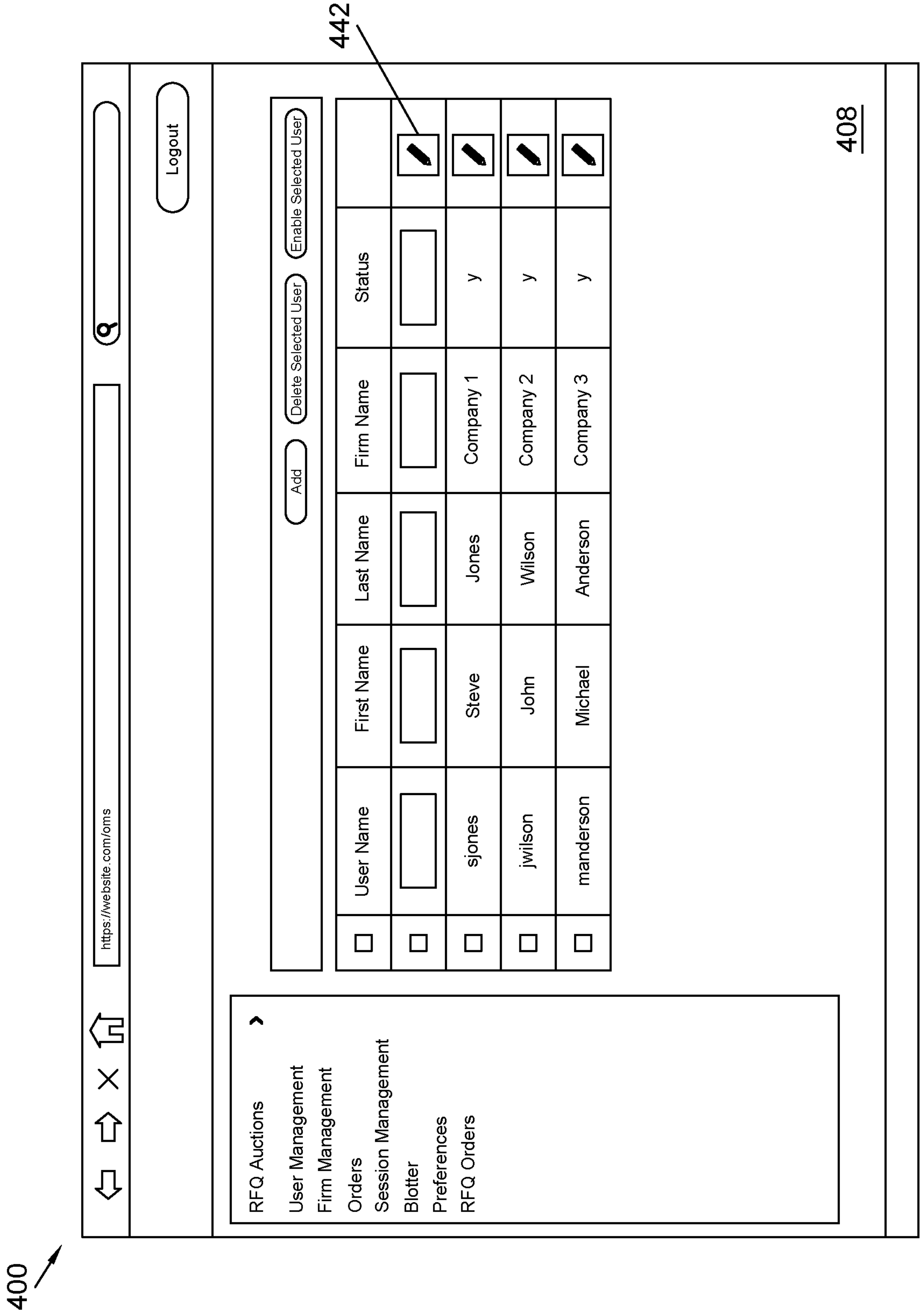

In example FIG. 4D, a webpage 408 of the originator system is shown editing the users of a firm/account. Just as with the webpage 404 of FIG. 4B, the webpage 408 presents a list of users associated with one or more companies within a managed firm/account. The webpage 408 may display a username, a first name, a last name, and a firm name associated with an individual user. Responsive to a selection of an interactive element 442, the originator system generates one or more input fields to add a new user to the firm/account, as shown in FIG. 4E.

Figure 4E:
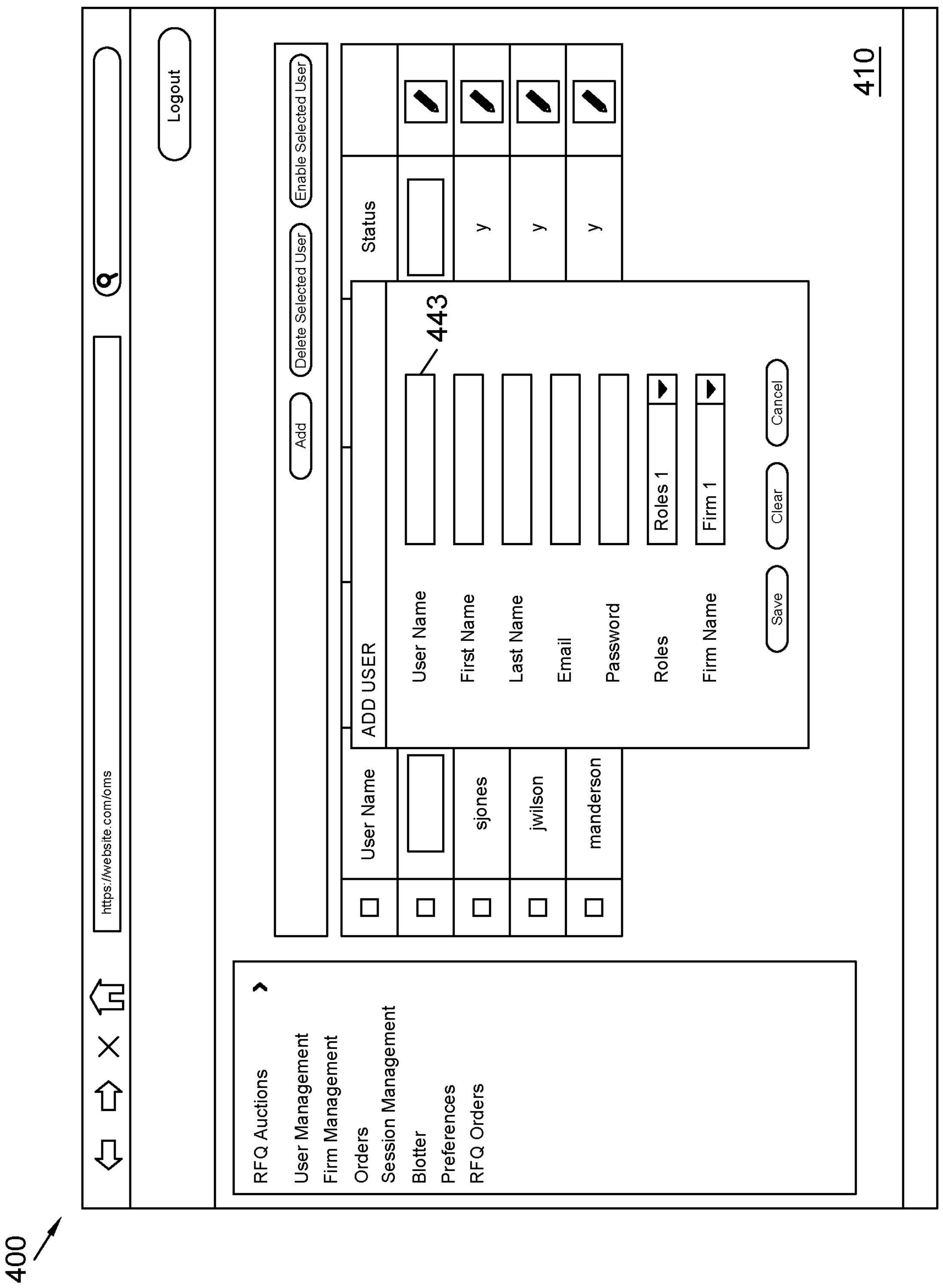

In example FIG. 4E, a webpage 410 of the originator system is shown with one or more input fields to add data, such as user name input field 443, associated with a new user to be added to the firm/account. Additional data input fields may include a first name of the new user, a last name of the new user, an email address of the new user, a password for the new user for authorization, a drop-down menu of roles associated with the user, and drop-down menu for the firm/account associated with the new user. The inputted data may be saved to the digital electronic storage device to be used in generating a user menu, such as webpage 408 of FIG. 4D.

In example FIG. 4F, a menu webpage 412 of the originator system is shown. The originator system may itself generate or may communicate with an execution system (e.g., the execution system 104 of FIG. 1) that generates and provides over a network (e.g., the network 116 of FIG. 1) the menu page of the dynamic order interface 400. The menu webpage 412 can include various dynamic order interactive elements, such as, but not limited to an import element 444*a* for importing various product profiles and/or datasets as well as portfolio datasets, a positions table 444*b* with various data corresponding to currently owned positions (e.g., the security owned, a purchase price, a last price, a market value) and an edit element 444*c* which, upon selecting, allows for inputs to edit a corresponding position. The menu webpage may also include an options table 444*d* for display of the currently owned options. The option element 444*e*, upon receiving a selection, causes the originator system to present webpage 414 of FIG. 4G.

Figure 4G:
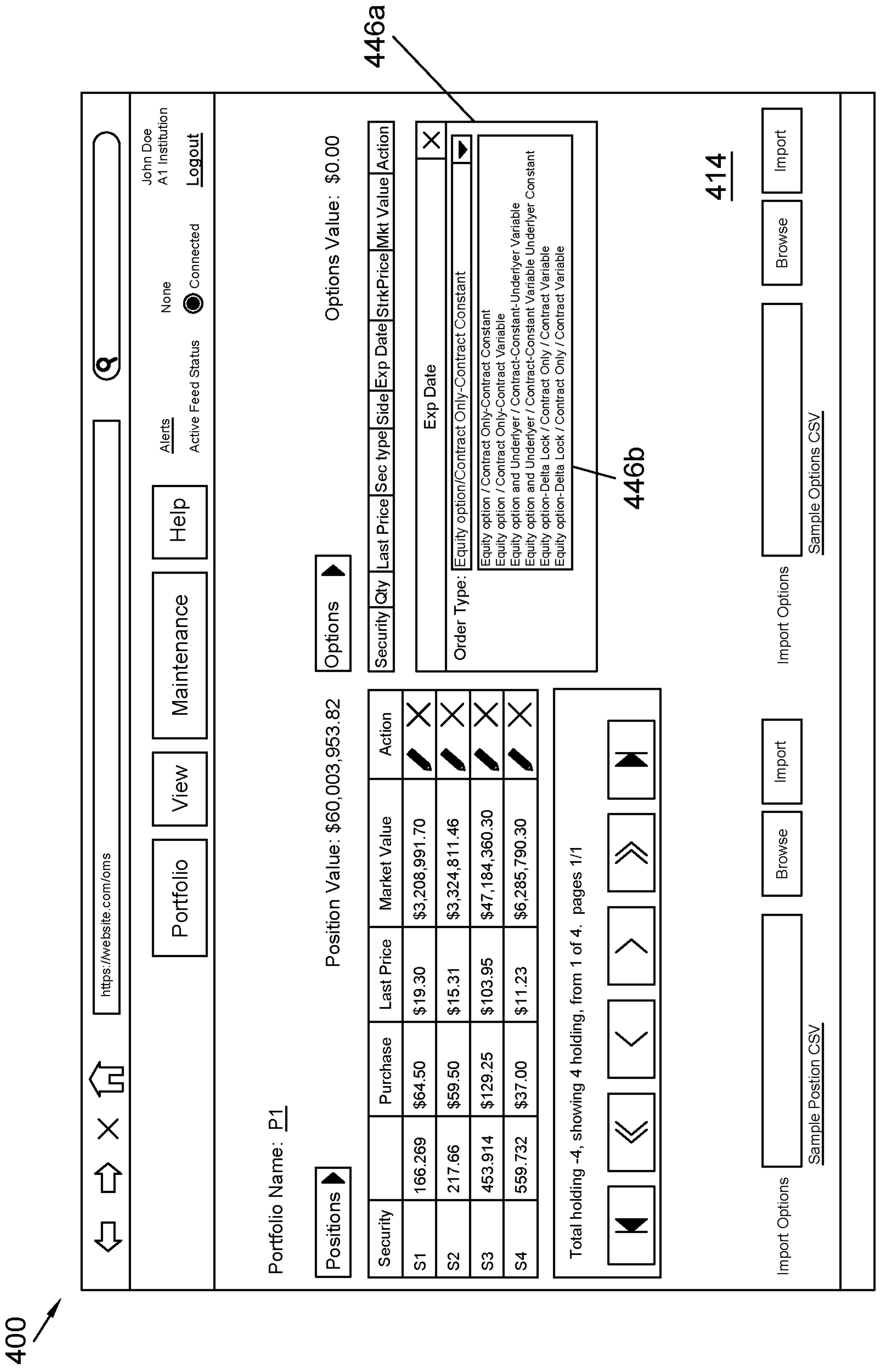

In example FIG. 4G, a webpage 414 of the originator system is shown. The webpage 414 may include, for example, an order menu 446*a* with a drop-down menu 446*b* that presents various alternative option order types (e.g., Equity Option/Contract Only-Contract Constant, Equity Option/Contract Only-Contract Variable, Equity Option and Underlyer/Contract-Constant-Underlyer Variable, Equity Option and Underlyer/Contract-Constant Variable Underlyer Constant, Equity Option-Delta Lock/Contract Only/Contract Variable, Equity Option-Delta Lock/Contract Only/Contract Variable). Each option type displayed may be an interactive element used to initiate a simulation menu, such as simulation webpage 416 of FIG. 4H.

Figure 4H:
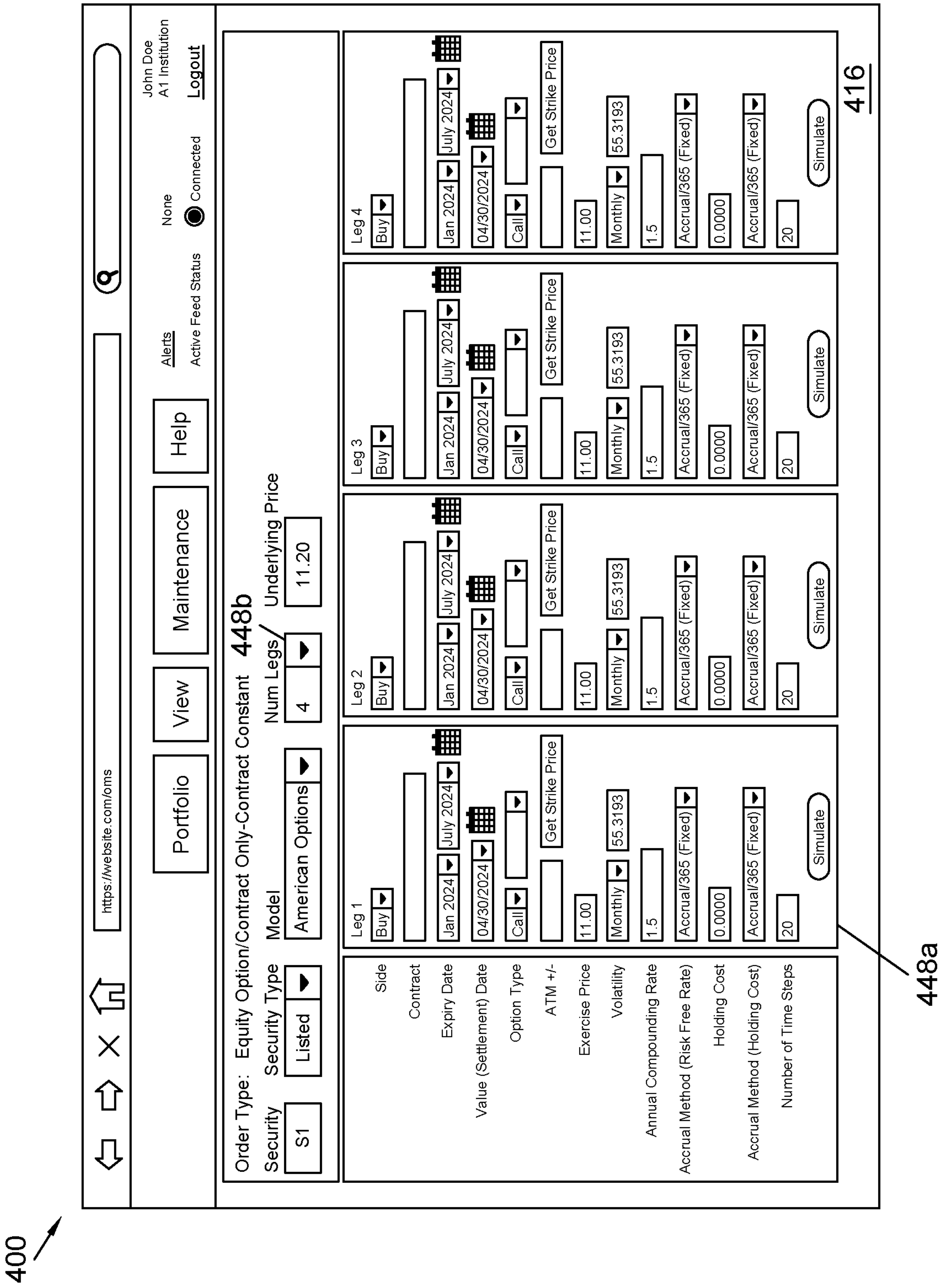

In example FIG. 4H, the simulation webpage 416 of the originator system is shown. Upon selecting an order type from the drop-down menu 446*b* of FIG. 4G, the simulation webpage 416 of FIG. 4H may be generated by the originator system and presented for display. The simulation webpage 416 may include one or more leg menus 448*a* for data entry associated with a leg of the order. In an embodiment illustrated in FIG. 4H, the interactive element 448*b* includes various order attributes to apply to the Leg 1 simulation, including, but not limited to an order side (e.g., buy/sell), a contract type, an expiry date, a value settlement date, an option type, an ATM+/−, and exercise price, a volatility, an annual compounding rate, an accrual method (risk-free rate), a holding cost, an accrual method (holding cost), and/or a number of time steps. Associated values and/or indications may be inputted to the input fields associated with the above attributes through the use of interactive elements. In an exemplary embodiment, the interactive element 448*b* receives an indication of "1 Leg" for the order simulation, thus presenting webpage 418 of FIG. 4I.

Figure 4I:
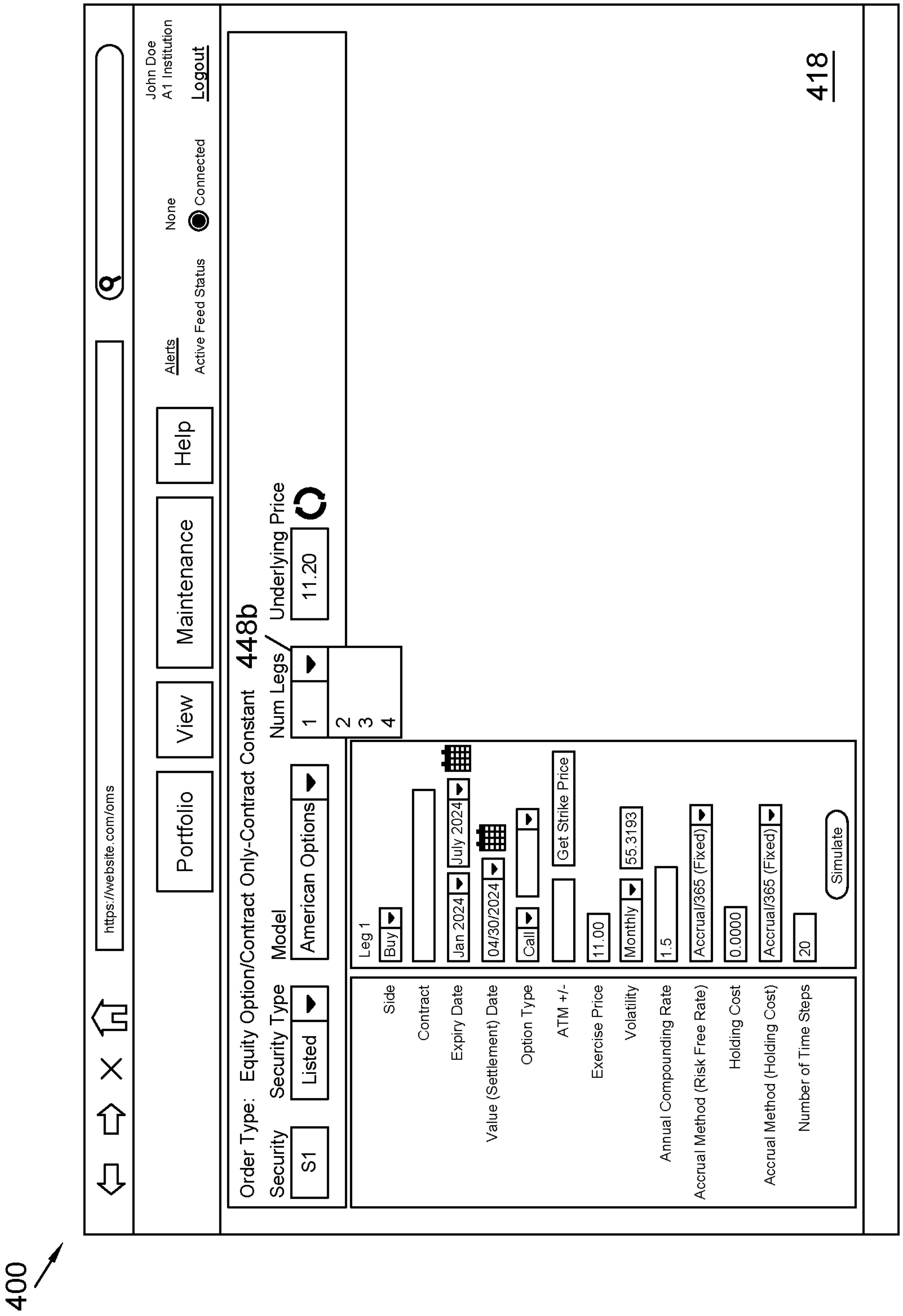

In example FIG. 4I, a webpage 418 of the originator system is shown selecting interactive element 448*b* to input "1" as the number of legs for the order simulation.

Figure 4J:
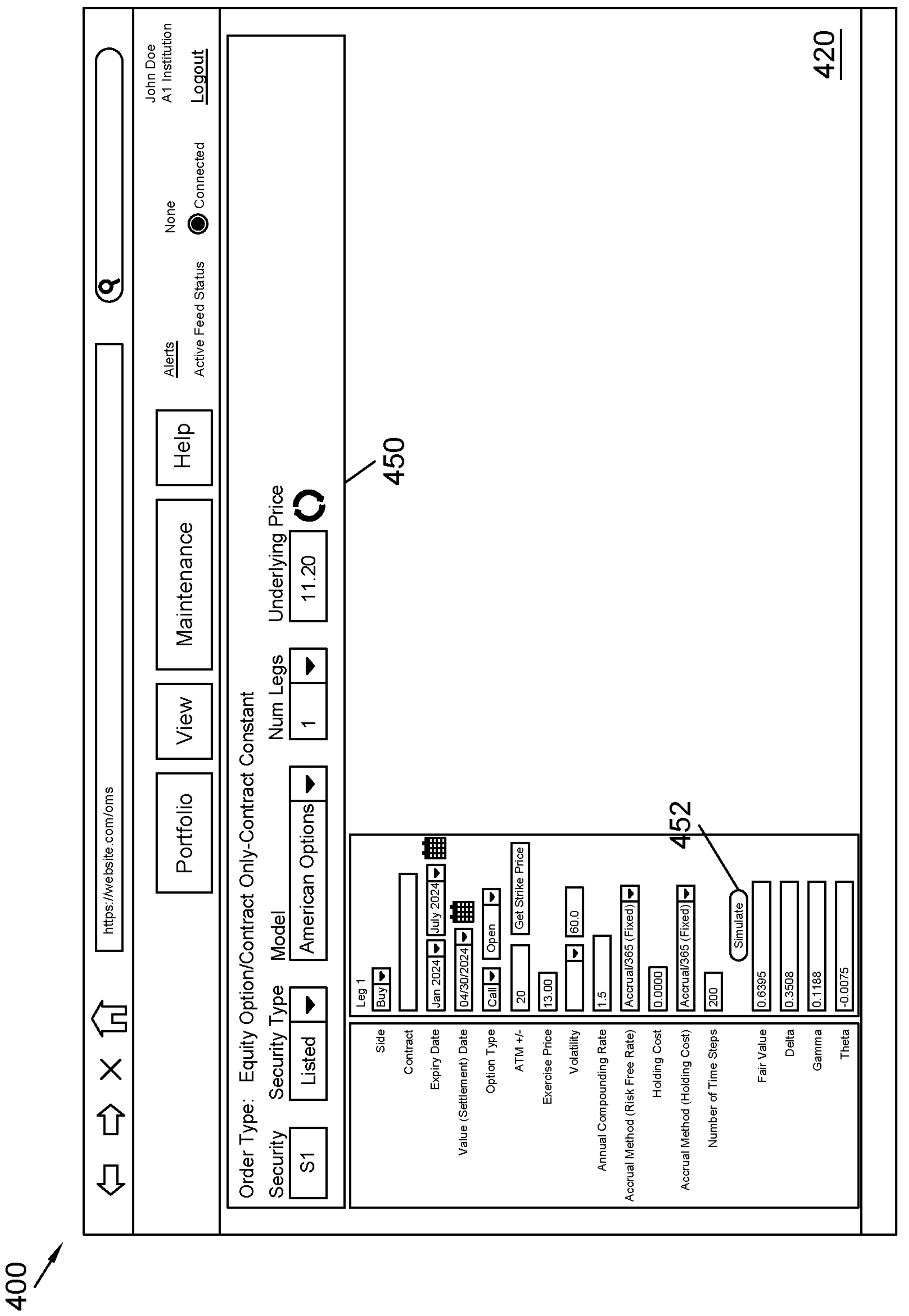

In example FIG. 4J, a webpage 420 of the originator system is shown with the various input fields associated with the order simulation attributes completed. As shown on webpage 420, additional simulation attributes may be included, such as a fair value, delta, gamma, and theta to be used in the simulation. Several additional simulation attributes may be either manually selected (e.g., security, security type, model type, number of legs) or dynamically updated (e.g., the underlying price) in the menu 450. Upon selecting the interactive element 452, a pricing simulation is executed.

Figure 4K:
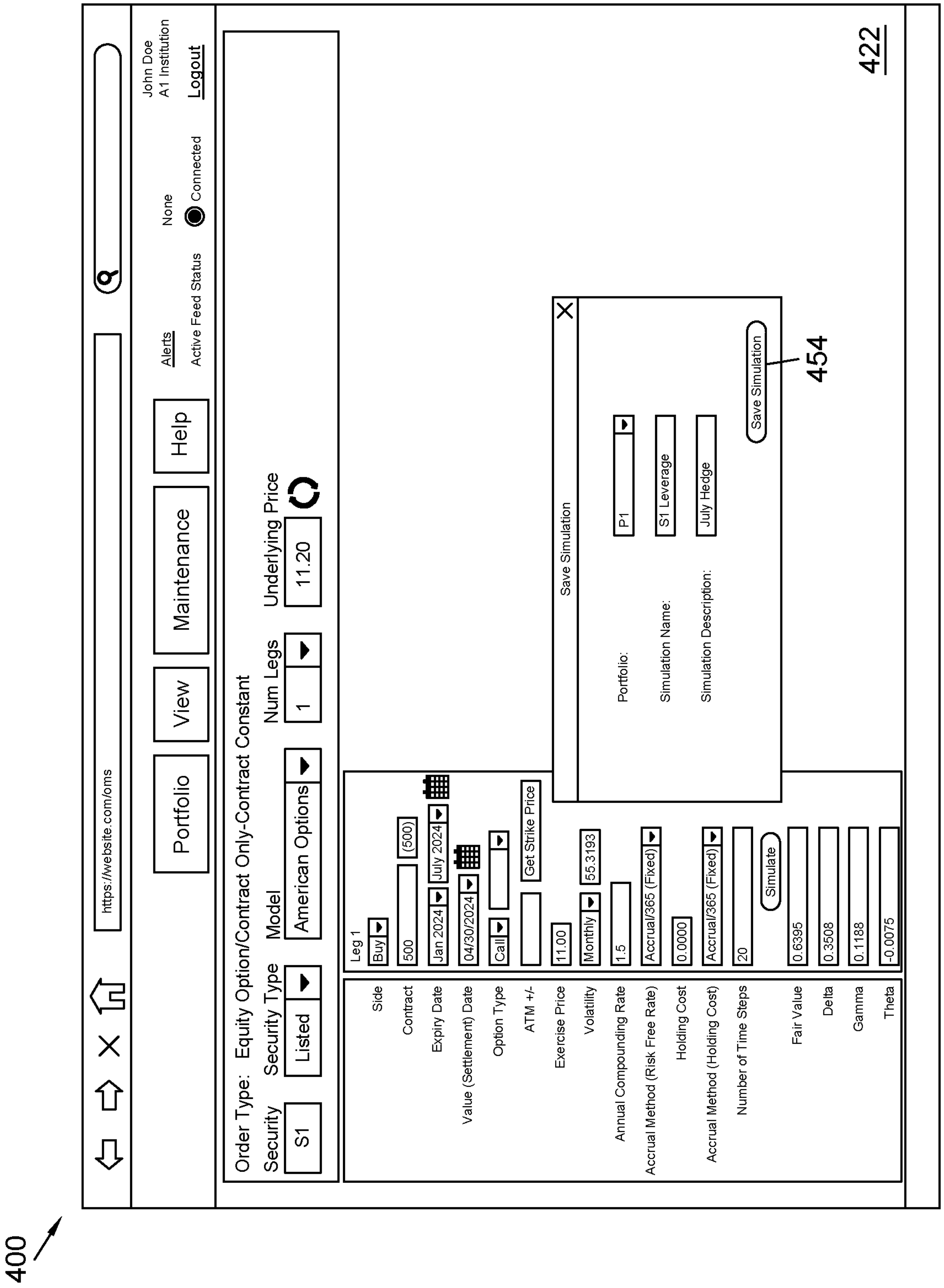

In example FIG. 4K, a webpage 422 of the originator system is shown upon completion of the simulation configured on webpage 420. The executed simulation may be saved for future access or entry by selecting the interactive element 454. Additional save attributes may be configured such as to which portfolio to save the simulation, a simulation name, and a simulation description.

Figure 4L:
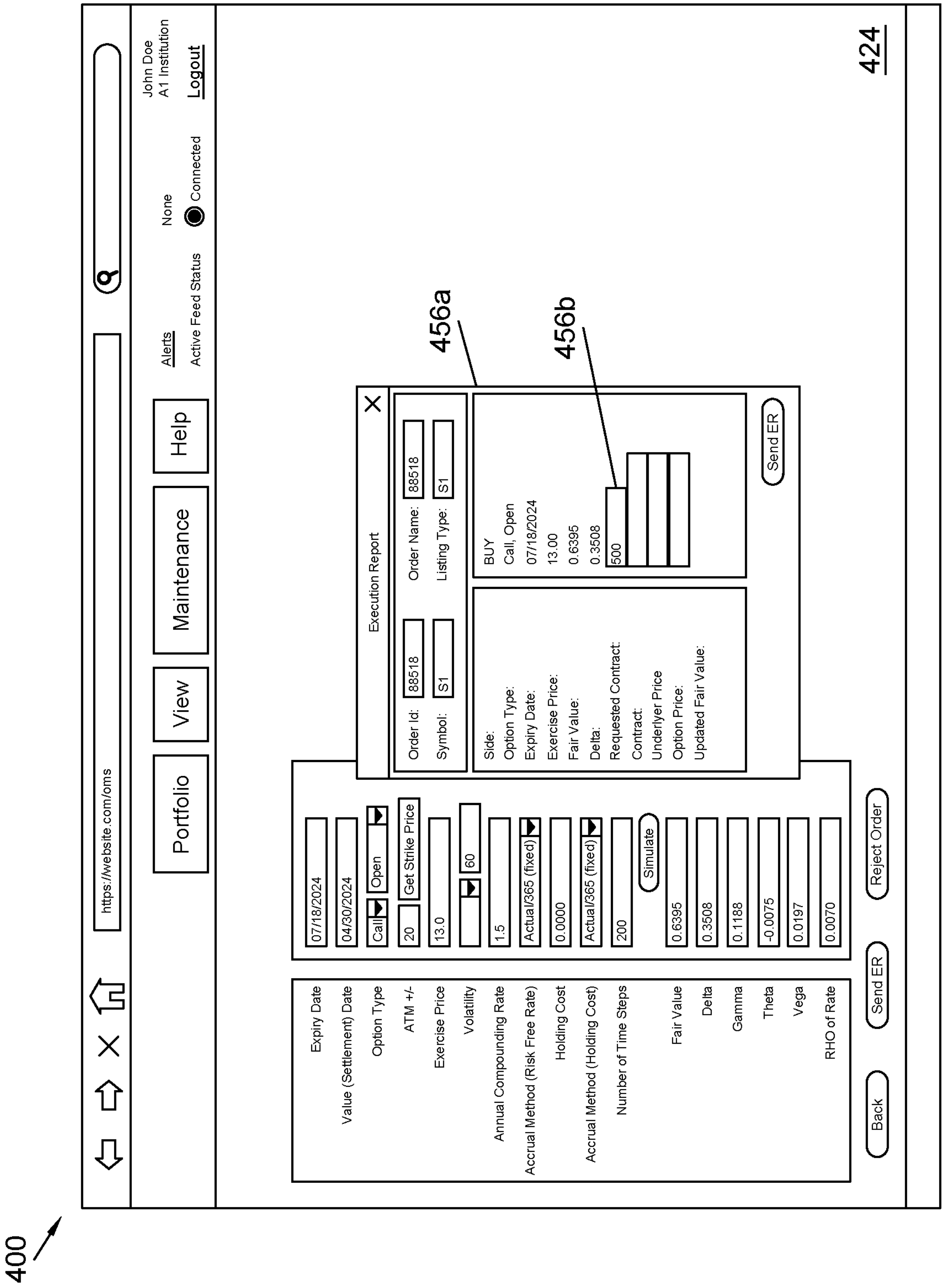

In example FIG. 4L, a webpage 424 of the originator system is shown presenting an execution report 456*a* that provides data in one or more input fields 456*b* of an executed trade. Various fields of the execution report 456*a* may be auto-populated by the originator system, the execution system, and/or the respondent system, based on various inputs at the originator system and/or the respondent system. Such auto-populated fields may include the originator side (e.g., buy/sell), option type, expiry date, exercise price, fair value, and delta. In some embodiments, the execution report 456*a* includes various fields for input, such as a requested contract amount, a contract, an underlyer price, and/or an option price.

Figure 4M:
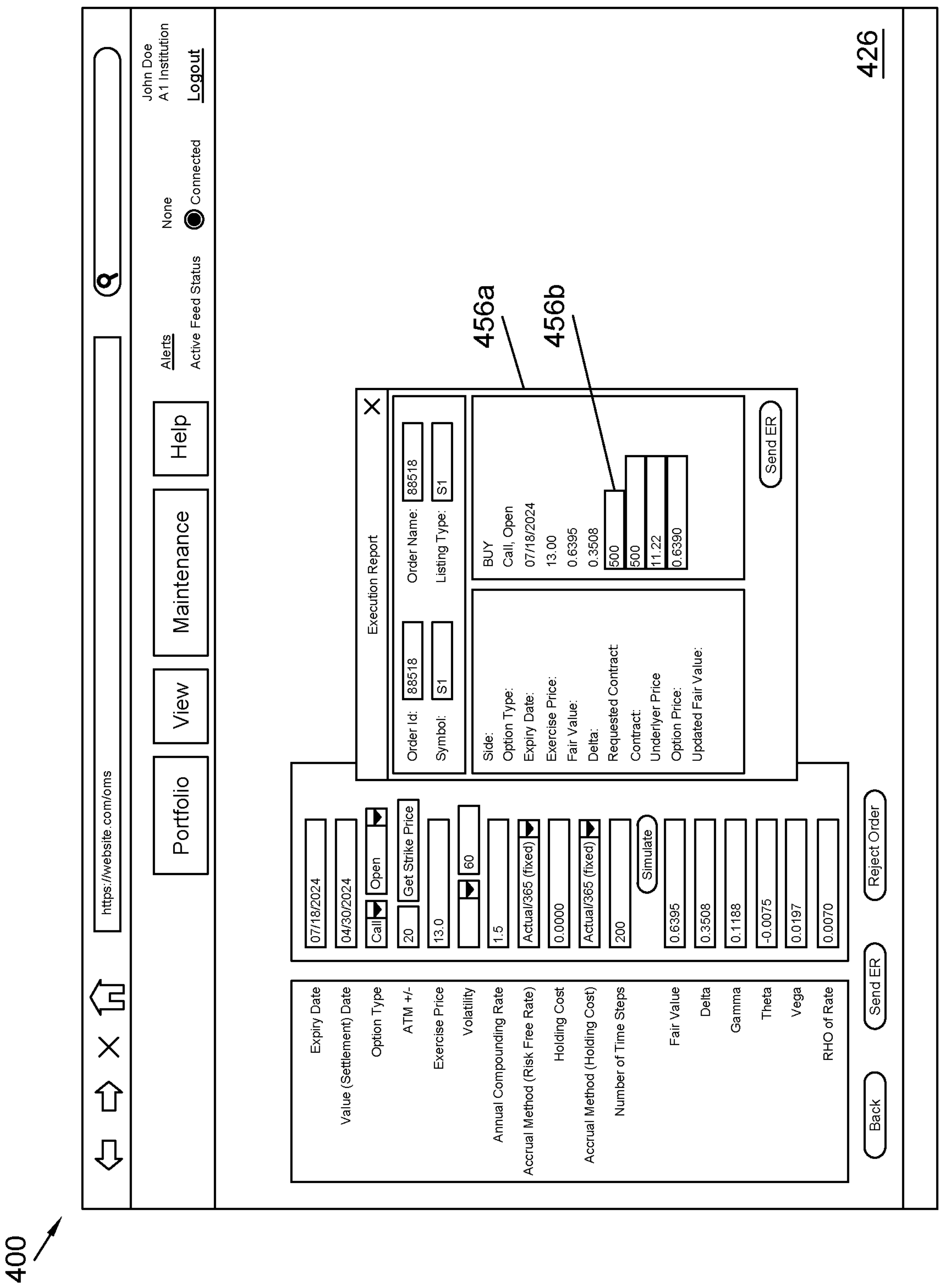

In example FIG. 4M, a webpage 426 of the originator system is shown with values inputted into the various input fields 456*b* of the execution report 456*a*. As described herein, the data included in the execution report 456*a* may be included in the dynamic order transmitted from the originator system to the execution system. Upon receipt, by the execution system, of the dynamic order, the execution system may bifurcate the data into protected data and unprotected data. For example, the security symbol, the security type, the option type, the expiry date, the exercise price, the requested contract, an option model, and an order type may be considered unprotected data and consequently presented for display to a respondent system. The bifurcated, protected dataset may include the underlyer price, the option price, and an updated fair value. It should be understood that the dynamic order interface 400 of FIGS. 4A-4S contemplates an equity option trade. However, it should also be understood that the same methods (e.g., inputting dynamic order attributes and obfuscating protected data) may be applied to dynamic orders of fixed-distribution underlyers (e.g., bonds) as well, as described in the methods and systems discussed herein.

Figure 4N:
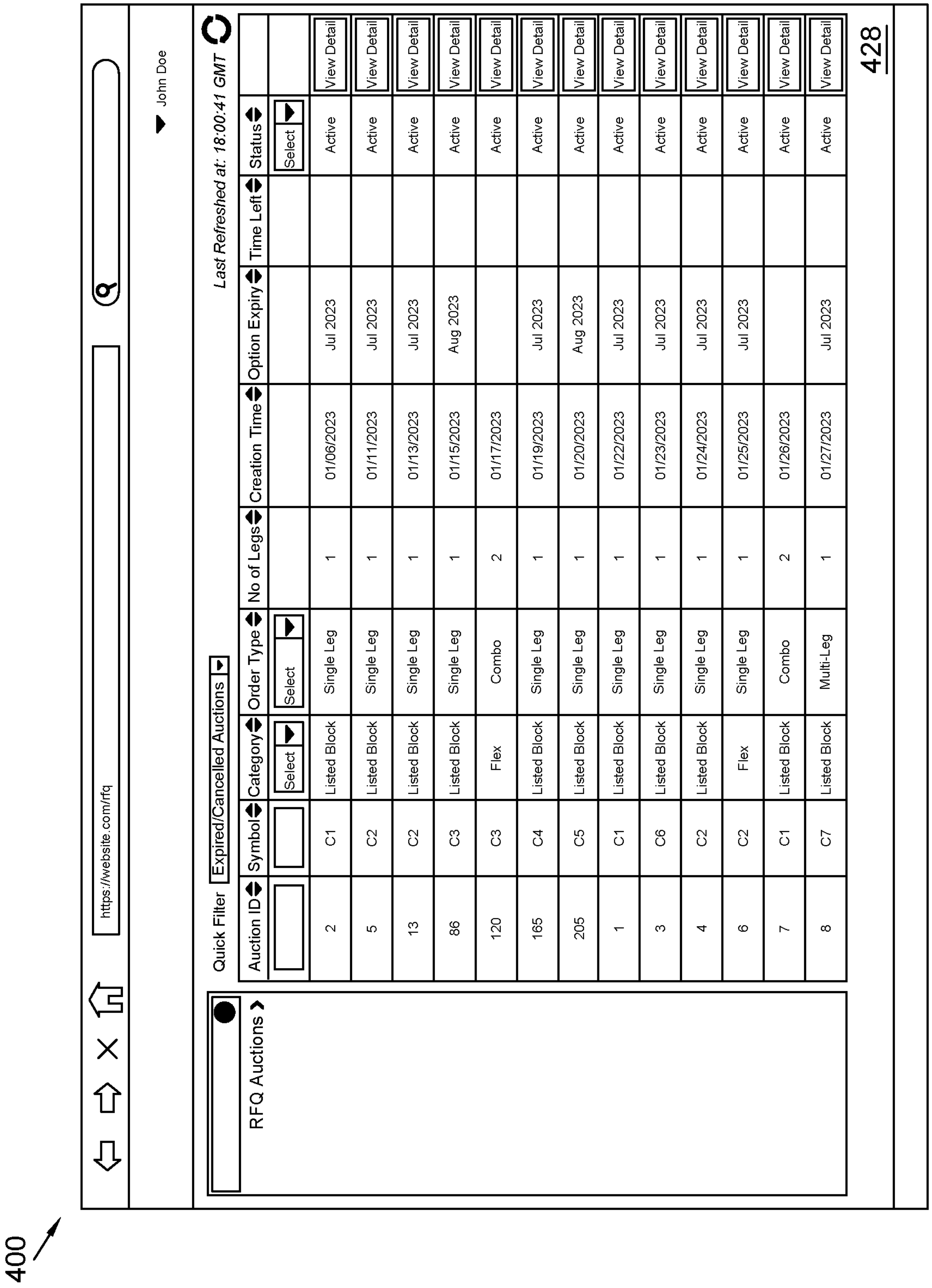

In example FIG. 4N, a webpage 428 of the respondent system is shown. Upon transmission of the dynamic order (as generated in FIG. 4M) to the execution system, the execution system may generate a proposal request dataset of the unprotected dataset from the dynamic order along with any current underlyer data from a data feed. The webpage 428 displays a list of all expired/canceled dynamic orders.

In example FIG. 4O, a webpage 430 of the respondent system is shown with a list of live dynamic orders. Upon selection of an interactive element corresponding to a live dynamic order, a response template may be generated and displayed to the respondent system, such as a response template 458*a* of FIG. 4P.

In example FIG. 4P, a webpage 432 of the respondent system is shown with the response template 458*a*. The response template 458*a* may be generated with the data from the proposal request dataset. In some embodiments, the response template 458*a* is the generated proposal request dataset. The user auto-populated data may be displayed as the unprotected data from the dynamic order. The protected data may be obfuscated or hidden from view or access. The respondent system may input values for the input fields (e.g., input field 458*b*). The input fields may include a quantity, a bid wanted, a volatility of the bid, an offer wanted, and/or a volatility of the offer. As described herein, the response template 458*a* includes both an input field for a bid as well as an offer. This two-sided proposal request ensures the anonymity of the originator and the protection of information that may induce preemptive action. In some embodiments, the volatility of the bid/offer may be calculated by the respondent system (or the execution system) automatically upon input of the quantity, bid wanted, and/or the offer wanted. In other embodiments, the user may select an interactive element to generate a volatility value.

In example FIG. 4Q, a webpage 434 of the respondent system is shown with the response template 458*a* completed with values in the one or more input fields (e.g., the input field 458*b*).

In example FIG. 4R, a webpage 436 of the respondent system is shown in which the respondent system may manage/adjust a previously submitted or saved response. Upon receiving the inputs for the one or more input fields (e.g., input field 458*b*) of the response template 458*a*, the inputted data may be compiled into a proposal response dataset and transmitted/saved to the execution system. The execution system may then dynamically compare, as described herein, the protected datasets to determine if a match between the proposal request and the proposal response exists. Upon the determination (whether in the affirmative or the negative), the execution system may execute the methods described herein, such as the method 500 of FIG. 5. In various embodiments, the input fields of the response template 458*a* are determined to be protected data from the execution system and obfuscated from other respondents and the originator until and unless a match occurs between the proposal request and the proposal response, at which point the originator is provided access to the matching values. In example FIG. 4S, a webpage 438 of the originator system is shown with a newly acquired option.

It should be understood that while reference to the originator system and the respondent system are described with reference to FIGS. 4A-4S, the respective webpages 402-438 may also be executed/generated by the execution system and transmitted to and/or accessed by the originator system or the respondent system.

Turning now to FIG. 5, a method 500 is shown as a flowchart for describing a method for data protection during dynamic relational order management.

At step 510, a data feed and a dynamic order comprising a plurality of order attributes is received, the plurality of order attributes including a protected dataset and an unprotected dataset, the protected dataset including at least a request type and a reserve execution threshold. The plurality of order attributes may be received in a dynamic order from an originator system. In some embodiments, the protected data set and the unprotected data set are indicated in the received plurality of order attributes. In some embodiments, a system receiving the plurality of order attributes, for example, an execution system, bifurcates the plurality of order attributes upon receipt of the plurality of order attributes. The request type may correspond to the type of request that the originator system is requesting. For example, the type may correspond to a liquidity provider or a liquidity requester.

At step 520, the protected dataset is obfuscated from display on a respondent system. The respondent system may be communicatively coupled to the execution system and/or the originator system. In some embodiments, upon receipt of the plurality of order attributes and upon bifurcating the plurality of order attributes into the protected data set and the unprotected datasets, the execution system obfuscates the protected data from either transmission to the respondent system for display or access by the respondent system for display.

At step 530, instructions to present for display a proposal request dataset for executing the dynamic order are transmitted to the respondent system, the proposal request dataset comprising the unprotected dataset and the data feed. The execution system generates a proposal request dataset comprising data from the plurality of order attributes and the data feed previously received. The proposal request dataset includes in some examples, the unprotected data set of the plurality of order attributes and a current standard value. In some embodiments, an identification of the standard is included in the unprotected dataset and the execution system requests a current value of the standard. The value may be any one of a variety of values, such as a YTM value. The execution system receives the requested data and includes the received data (e.g., the current value of the standard underlyer). Upon receipt, the execution system generates the proposal request dataset to transmit or otherwise make available for access to one or more respondent systems.

At step 540, a proposal response dataset for executing the dynamic order is received from one or more respondent systems, the proposal response dataset comprising a first execution value associated with an amount to execute the dynamic order and a second execution value associated with an amount to execute the dynamic order. As described herein the first execution value may be associated with a liquidity provider position (e.g., a bid) and the second execution value may be associated with a liquidity requester position (e.g., an offer). In an exemplary embodiment, each proposal request dataset includes a selectable input field for including both a bid and an offer. Indeed, in some embodiments, both are required. In various embodiments, the proposal response dataset is generated either by the execution system or the respondent system in response to received inputs to the proposal request dataset generated by the execution system. In some embodiments, the first execution value and the second execution value are indicated in a measure of basis points above or below a current YTM value of the standard. However, it should be noted that other measures are contemplated, such as currency amount or any other standard of measure.

At step 550, an adjusted reserve execution threshold, an adjusted first execution value, and an adjusted second execution value are generated. The received first and second execution values are converted to a second standard of measure, for example, if received in basis points, the first and second execution values are converted to monetary amounts based on the YTM value (or other benchmark value) at the end of a solicitation period. In addition, the reserve execution threshold is converted, such that the adjusted reserve execution threshold, the adjusted first execution value, and the adjusted second execution value are in the same unit of measure (e.g., dollars).

At step 560, an execution action in response to the adjusted first execution value or the adjusted second execution value satisfying the adjusted reserve execution threshold is performed. By way of example, if one of the adjusted first execution value and the adjusted second execution value satisfies the adjusted reserve execution threshold, the satisfying execution value is selected as the winning proposal and the execution system automatically initiates (e.g., by transmitting instructions) execution of the dynamic order. In an embodiment in which none of the adjusted execution values satisfy the adjusted reserve execution threshold, the execution system determines the corresponding adjusted execution value closest to the adjusted reserve execution threshold. The execution engine determines a mediated value (e.g., a midpoint) between the adjusted reserve execution threshold and the closest adjusted execution value (as determined at the conclusion of the solicitation period, and not at the time of response and origination). The mediated value is transmitted to both the originator system and the respondent system for acceptance. Upon receiving an indication of acceptance from both the originator system and the respondent system, the execution system initiates the execution action to execute the dynamic order. If either the originator system or the respondent system declines the mediated value, the dynamic order is closed, and no exchange occurs.

Turning now to FIG. 6, a method 600 is illustrated as a flowchart describing a method for modeling a product in relation to various corresponding products. At step 610, a product dataset associated with a product (e.g., a bond portfolio) comprising one or more subproducts (e.g., individual bonds and/or stocks), a first corresponding product dataset associated with a first corresponding product (e.g., a bond ETF) and a second corresponding product dataset associated with a second corresponding product are received.

At step 620, a product model output corresponding to the product is determined/generated, wherein the product model output is a single, value-weighted indicator of the product. In some embodiments, the product model output comprises a plurality of single, value-weighted indicators (e.g., prices) over a look-back period from the time the product model output is determined/generated. In some embodiments, corresponding product model outputs are determined/generated for the first corresponding product and the second corresponding product as well. In various embodiments, the model output of both the product and/or the corresponding products is a measurable unit, comparable across products and corresponding products (e.g., the single, value-weighted indicators, as described herein), whether the same unit or not.

At step 630, a first variability index corresponding to the first corresponding product based at least on the product model output and the first corresponding product dataset, and a second variability index corresponding to the second corresponding product based at least on the product model output and the second corresponding product dataset are determined. A statistical fitting of the data (e.g., a linear fit, a quadratic fit, a polynomial fit, a logarithmic fit, etc.) may be generated. The corresponding product model output (either generated by a product modeler or received by the product modeler) is compared to either the product model output or the generated statistical fitting to determine a variability index (e.g., a coefficient of determination) of the corresponding product model. By finding a corresponding model that has a low degree of variability (e.g., a high variability index), a user may minimize the effects of movement in the owned product by having an opposite position (e.g., short) in the corresponding product with a high variability index.

At step 640, upon determining the corresponding product with the highest variability index, a visual indicator on a graphical user interface of the first variability index and the second variability index is displayed. In some embodiments, the corresponding product with the highest determined variability index is presented on the graphical user interface with the associated variability index. Additional corresponding products may be displayed in relation to the corresponding product with the highest variability index. For example, the corresponding products may be presented in order of highest variability index to lowest variability index. In further embodiments, an execution system upon which this process is executed may perform additional, automatic steps upon determining the highest variability index and associated corresponding product.

While described herein in the context of the second underlyer class, it is understood that the systems and methods described above may also apply similarly in the context of the first underlyer class. It should also be understood that while this description includes reference to the execution system 104 transmitting data to the originator system 102 and/or the execution system 104, such description may also be interpreted to mean that the execution system 104 provides the originator system 102 and/or the execution system 104 access to the "transmitted" data on the execution system 104.

It will be understood that the embodiments of the present invention described herein are merely exemplary and that a person skilled in the art may make many variations and modifications without departing from the spirit and scope of the invention. All such variations and modifications, including those discussed above, are intended to be included within the scope of the invention as defined in the appended claims.

Unless specifically stated otherwise as apparent from the following discussion, it is appreciated that throughout the description, discussions utilizing terms such as "creating," "executing," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The embodiments can relate to an apparatus for performing one or more of the functions described herein. This apparatus may be specially constructed for the required purposes, or it may comprise a general-purpose computer selectively activated or reconfigured by a computer program stored in the computer for executing one or more computer-implemented methods. Such a computer program may be stored in a machine (e.g. computer) readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The embodiments described herein are described as software executed on at least one server or system, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to the disclosure, including computer-implemented methods.

It is to be appreciated that the various components of the technology can be located at distant portions of a distributed network and/or the Internet, or within a dedicated secure, unsecured, and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components can be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms "determine," "calculate" and "compute," and variations thereof, as used herein are used interchangeably and include any type of methodology, process, mathematical operation, or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method for data protection during dynamic relational order management, the computer-implemented method comprising:

receiving, by one or more processors, a data feed and a dynamic order comprising a plurality of order attributes;

bifurcating, by the one or more processors, the plurality of order attributes of the dynamic order into a protected dataset and an unprotected dataset, the protected dataset including at least a request type and a reserve execution threshold, wherein the reserve execution threshold corresponds to an authorizing value to execute the dynamic order;

obfuscating, by the one or more processors, the protected dataset from display on a respondent system, wherein obfuscating the protected dataset comprises one or more of removing the protected dataset from a transmitted data packet, adjusting a hypertext markup language ("HTML") instruction, hiding from display, masking, or intercepting the protected dataset from transmittal;

transmitting, by the one or more processors to the respondent system, instructions to present for display a proposal request dataset for executing the dynamic order, the proposal request dataset comprising the unprotected dataset and the data feed;

receiving, by the one or more processors from the respondent system, a proposal response dataset for executing the dynamic order, the proposal response dataset comprising a first execution value associated with an amount to execute the dynamic order and a second execution value associated with an amount to execute the dynamic order;

generating, by the one or more processors, an adjusted reserve execution threshold, an adjusted first execution value, and an adjusted second execution value, wherein the adjusted reserve execution threshold corresponds to an adjusted authorizing value to execute the order; and performing, by the one or more processors, an execution action in response to the adjusted first execution value or the adjusted second execution value satisfying the adjusted reserve execution threshold.

2. The computer-implemented method of claim 1, further comprising:

generating, by the one or more processors, the proposal request dataset, the data feed of the proposal request dataset comprising a yield to maturity value associated with a standard value of a standard underlyer and the dynamic order.

3. The computer-implemented method of claim 2, wherein:

the first execution value of the proposal response dataset corresponding to a bid to execute the dynamic order is a first amount of basis points above or below a first yield to maturity value at a time of response;

the second execution value of the proposal response dataset corresponding to an offer to execute the dynamic order is a second amount of basis points above or below the first yield to maturity value at the time of response; and the reserve execution threshold is a third amount of basis points above or below a second yield to maturity value associated with the yield to maturity at a time of origination in an originator system by a liquidity seeker.

4. The computer-implemented method of claim 3, wherein:

the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order;

the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

5. The computer-implemented method of claim 2, wherein the standard underlyer is a fixed-disbursement underlyer including one or more of an investment-grade bond, a high-yield corporate bond, a U.S. Treasury bond, a municipal bond, a U.S. agency bond, and a mortgage bond.

6. The computer-implemented method of claim 1, wherein the unprotected dataset of the dynamic order includes an issuer, a coupon, a maturity date, a number of bonds, and a standard underlyer.

7. The computer-implemented method of claim 1, wherein the protected dataset further comprises an identity of an entity originating the dynamic order and the reserve execution threshold comprising a minimum value in the case of a sale of an order instrument or a maximum value in the case of a purchase of an order instrument as established by an originator system.

8. The computer-implemented method of claim 1, further comprising:

generating, by the one or more processors, instructions to display on a client device one or more content items associated with the dynamic order and one or more selectable objects for input by an originator system of one or more of the plurality of order attributes.

9. The computer-implemented method of claim 1, further comprising:

receiving, by the one or more processors from a second respondent system, a second proposal response dataset; and obfuscating, by the one or more processors, the proposal response dataset and the second proposal response dataset from display to an originator system and the respondent system.

10. The computer-implemented method of claim 1, wherein performing the execution action further comprises:

in response to the adjusted first execution value or the adjusted second execution value satisfying the adjusted reserve execution threshold, generating, by the one or more processors, an instruction to execute the dynamic order, wherein the satisfying adjusted first execution value or the satisfying adjusted second execution value corresponds with the request type;

transmitting, by the one or more processors, the instruction to an exchange system to execute the dynamic order at the satisfying adjusted first execution value or the satisfying adjusted second execution value;

in response to neither the adjusted first execution value nor the adjusted second execution value satisfying the adjusted reserve execution threshold, determining, by the one or more processors, a mediated execution value;

transmitting, by the one or more processors to an originator system and the respondent system, for display, the mediated execution value; and in response to receiving, by the one or more processors, a first acceptance of the mediated execution value by the originator system and a second acceptance of the mediated execution value by the respondent system, transmitting, by the one or more processors, a second instruction to the exchange system to execute the dynamic order at the mediated execution value.

11. A non-transitory, computer-readable medium containing instructions for causing one or more processors to perform a method comprising:

receiving a data feed and a dynamic order comprising a plurality of order attributes;

bifurcating the plurality of order attributes of the dynamic order into a protected dataset and an unprotected dataset, the protected dataset including at least a request type and a reserve execution threshold, wherein the reserve execution threshold corresponds to an authorizing value to execute the dynamic order;

obfuscating the protected dataset from display on a respondent system, wherein obfuscating the protected dataset comprises one or more of removing the protected dataset from a transmitted data packet, adjusting a hypertext markup language ("HTML") instruction, hiding from display, masking, or intercepting the protected dataset from transmittal;

transmitting, to the respondent system, display instructions to present for display a proposal request dataset for executing the dynamic order, the proposal request dataset comprising the unprotected dataset and the data feed;

receiving, from the respondent system, a proposal response dataset for executing the dynamic order, the proposal response dataset comprising a first execution value associated with an amount to execute the dynamic order and a second execution value associated with an amount to execute the dynamic order;

generating an adjusted reserve execution threshold, an adjusted first execution value, and an adjusted second execution value, wherein the adjusted reserve execution threshold corresponds to an adjusted authorizing value to execute the order; and performing an execution action in response to the adjusted first execution value or the adjusted second execution value satisfying the adjusted reserve execution threshold.

12. The non-transitory, computer-readable medium of claim 11, the method further comprising:

generating the proposal request dataset, the data feed of the proposal request dataset comprising:

a current amount of a standard underlyer; and a yield to maturity value associated with a standard value and the dynamic order.

13. The non-transitory, computer-readable medium of claim 11, wherein:

the first execution value of the proposal response dataset corresponding to a bid to execute the dynamic order is a first amount of basis points above or below a first yield to maturity value at a time of response;

the second execution value of the proposal response dataset corresponding to an offer to execute the dynamic order is a second amount of basis points above or below the first yield to maturity value at the time of response; and the reserve execution threshold is a third amount of basis points above or below a second yield to maturity value associated with the yield to maturity at a time of origination.

14. The non-transitory, computer-readable medium of claim 11, wherein:

the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order;

the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

15. The non-transitory, computer-readable medium of claim 11, the method further comprising:

in response to the adjusted first execution value or the adjusted second execution value satisfying the adjusted reserve execution threshold, generating an instruction to execute the dynamic order, wherein the satisfying adjusted first execution value or the satisfying adjusted second execution value corresponds with the request type;

transmitting the instruction to an exchange system to execute the dynamic order at the satisfying adjusted first execution value or the satisfying adjusted second execution value;

in response to neither the adjusted first execution value nor the adjusted second execution value satisfying the adjusted reserve execution threshold, determining a mediated execution value;

transmitting to an originator system and the respondent system, for display, the mediated execution value; and in response to receiving a first acceptance of the mediated execution value by the originator system and a second acceptance of the mediated execution value by the respondent system, transmitting a second instruction to the exchange system to execute the dynamic order at the mediated execution value.

16. A system comprising:

a display;

one or more processors; and a non-transitory, computer-readable medium containing instructions that when executed by the one or more processors cause the one or more processors to perform operations comprising:

receiving a data feed and a dynamic order comprising a plurality of order attributes;

bifurcating the plurality of order attributes of the dynamic order into a protected dataset and an unprotected dataset, the protected dataset including at least a request type and a reserve execution threshold, wherein the reserve execution threshold corresponds to an authorizing value to execute the dynamic order;

obfuscating the protected dataset from display on a respondent system, wherein obfuscating the protected dataset comprises one or more of removing the protected dataset from a transmitted data packet, adjusting a hypertext markup language ("HTML") instruction, hiding from display, masking, or intercepting the protected dataset from transmittal;

transmitting, to the respondent system, display instructions to present for display a proposal request dataset for executing the dynamic order, the proposal request dataset comprising the unprotected dataset and the data feed;

receiving, from the respondent system, a proposal response dataset for executing the dynamic order, the proposal response dataset comprising a first execution value associated with an amount to execute the dynamic order and a second execution value associated with an amount to execute the dynamic order;

generating an adjusted reserve execution threshold, an adjusted first execution value, and an adjusted second execution value, wherein the adjusted reserve execution threshold corresponds to an adjusted authorizing value to execute the order; and performing an execution action in response to the adjusted first execution value or the adjusted second execution value satisfying the adjusted reserve execution threshold.

17. The system of claim 16, the operations further comprising:

generating the proposal request dataset, the data feed of the proposal request dataset comprising:

a current amount of a standard underlyer; and a yield to maturity value associated with a standard value and the dynamic order.

18. The system of claim 16, wherein:

the adjusted first execution value is generated by converting the first execution value to a first monetary amount based at least on the first execution value and a closing yield to maturity value, wherein the closing yield to maturity corresponds to the yield to maturity at a conclusion of a solicitation period for the dynamic order;

the adjusted second execution value is generated by converting the second execution value to a second monetary amount based at least on the second execution value and the closing yield to maturity value; and the adjusted reserve execution threshold is generated by converting the reserve execution threshold to a third monetary amount based at least on the reserve execution threshold and the closing yield to maturity value.

19. The system of claim 16, the operations further comprising:

in response to the adjusted first execution value or the adjusted second execution value satisfying the adjusted reserve execution threshold, generating an instruction to execute the dynamic order, wherein the satisfying adjusted first execution value or the satisfying adjusted second execution value corresponds with the request type;

transmitting the instruction to an exchange system to execute the dynamic order at the satisfying adjusted first execution value or the satisfying adjusted second execution value;

in response to neither the adjusted first execution value nor the adjusted second execution value satisfying the adjusted reserve execution threshold, determining a mediated execution value;

transmitting to an originator system and the respondent system for display, the mediated execution value; and in response to receiving a first acceptance of the mediated execution value by the originator system and a second acceptance of the mediated execution value by the respondent system, transmitting a second instruction to the exchange system to execute the dynamic order at the mediated execution value.

* * * * *